United States Patent
Shiohara et al.

(10) Patent No.: US 9,565,425 B2
(45) Date of Patent: Feb. 7, 2017

(54) METHOD OF MEASURING SHUTTER TIME LAG, DISPLAY DEVICE FOR MEASURING SHUTTER TIME LAG, SHUTTER TIME LAG MEASUREMENT APPARATUS, METHOD OF MANUFACTURING CAMERA, METHOD OF MEASURING DISPLAY DELAY OF CAMERA, AND DISPLAY DELAY MEASUREMENT APPARATUS

(71) Applicant: SEIKO EPSON CORPORATION, Tokyo (JP)

(72) Inventors: Ryuichi Shiohara, Nagano (JP); Tatsuya Ichikawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/434,302

(22) PCT Filed: Oct. 8, 2013

(86) PCT No.: PCT/JP2013/005980
§ 371 (c)(1),
(2) Date: Apr. 8, 2015

(87) PCT Pub. No.: WO2014/057654
PCT Pub. Date: Apr. 17, 2014

(65) Prior Publication Data
US 2015/0237343 A1    Aug. 20, 2015

(30) Foreign Application Priority Data

Oct. 12, 2012 (JP) .................. 2012-226674
Oct. 12, 2012 (JP) .................. 2012-226675
Oct. 12, 2012 (JP) .................. 2012-226676

(51) Int. Cl.
*H04N 17/00*    (2006.01)
*H04N 5/232*    (2006.01)

(52) U.S. Cl.
CPC ........ *H04N 17/002* (2013.01); *H04N 5/23293* (2013.01)

(58) Field of Classification Search
CPC .. H04N 17/002; H04N 5/23293; H04N 5/217; H04N 5/2353; G06T 7/0018
(Continued)

(56) References Cited

U.S. PATENT DOCUMENTS 9,077,961 B1 * 7/2015 Saltzman ............... H04N 5/235
2002/0080245 A1   6/2002 Parulski et al.
(Continued)

FOREIGN PATENT DOCUMENTS

CN    1909678 A    2/2007
EP    1628492 A1    2/2006
(Continued)

OTHER PUBLICATIONS

The Communication for the corresponding European Application No. 13845890.6 dated Jul. 1, 2016.
(Continued)

*Primary Examiner* — Nhan T Tran
(74) *Attorney, Agent, or Firm* — Global IP Counselors, LLP

(57) ABSTRACT

A method of measuring a shutter time lag of a camera includes: a first step of switching a display pattern of a display unit including i (i is a natural number greater than 2) display elements to a different display pattern at every time TP, and in the first step, the number of j (j is a natural number, and 1<j<i) display elements to be brought into a first display state among i display elements is switched at every time TP; a second step of capturing an image of the display unit in response to a shutter operation of the camera performed in synchronization with the switching operation; and a third step of deducing a shutter time lag taken from the
(Continued)

shutter operation to the imaging of the display unit from the image captured by the camera.

13 Claims, 15 Drawing Sheets

(58) Field of Classification Search
USPC .......................................... 348/180, 187, 367
See application file for complete search history.

(56) References Cited

U.S. PATENT DOCUMENTS

| | | | |
|---|---|---|---|
| 2004/0218087 A1* | 11/2004 | Jazbutis | H04N 5/2353 348/362 |
| 2008/0002029 A1* | 1/2008 | He | H04N 17/002 348/180 |
| 2008/0151070 A1 | 6/2008 | Shiozawa et al. | |
| 2010/0321506 A1* | 12/2010 | Li | H04N 17/002 348/187 |
| 2011/0298962 A1 | 12/2011 | Shiohara | |

FOREIGN PATENT DOCUMENTS

| | | |
|---|---|---|
| EP | 2437247 A1 | 4/2012 |
| JP | 2002-290979 A | 10/2002 |
| JP | 2009-171334 A | 7/2009 |
| JP | 2010-206520 A | 9/2010 |
| JP | 2011-182374 A | 9/2011 |

OTHER PUBLICATIONS

Catalogue Esser Test Charts, a registered Trademark of Image Engineering, retrieved from the Internet: URL: http://www.myt.com.hk/UploadFile/Download/2011011718063821.pdf, 2008/2009, pp. 1-39.

LED-Panel; Inage Engineering GmbH & CO. KG; Germany (Admitted Prior Art).

The Extended European Search Report for the corresponding European Application No. 13845890.6 dated Sep. 27, 2016.

* cited by examiner

FIG. 1
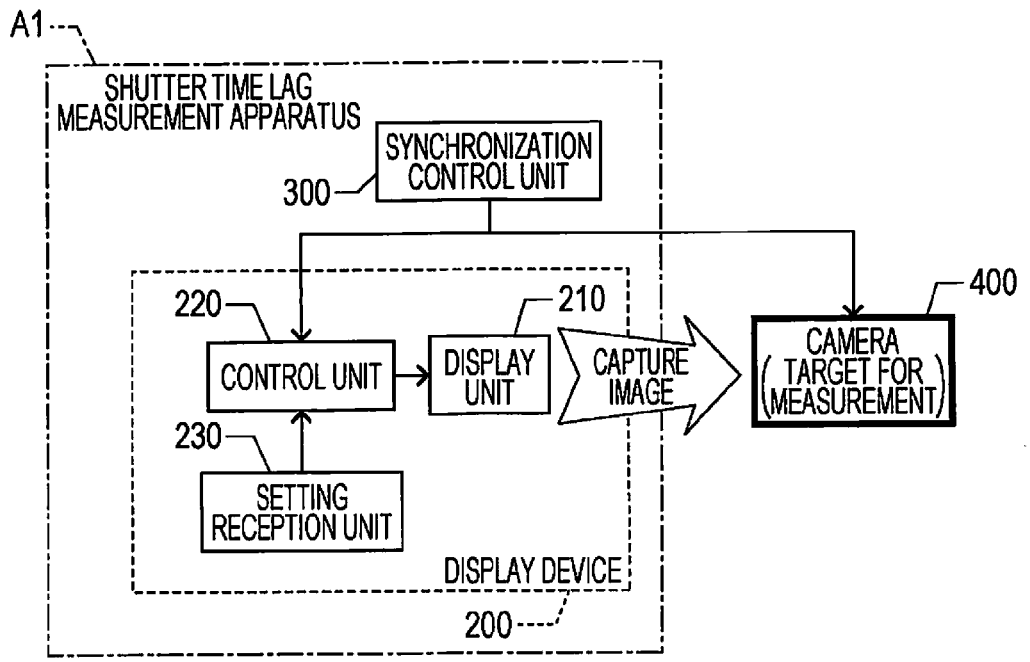
(1A)
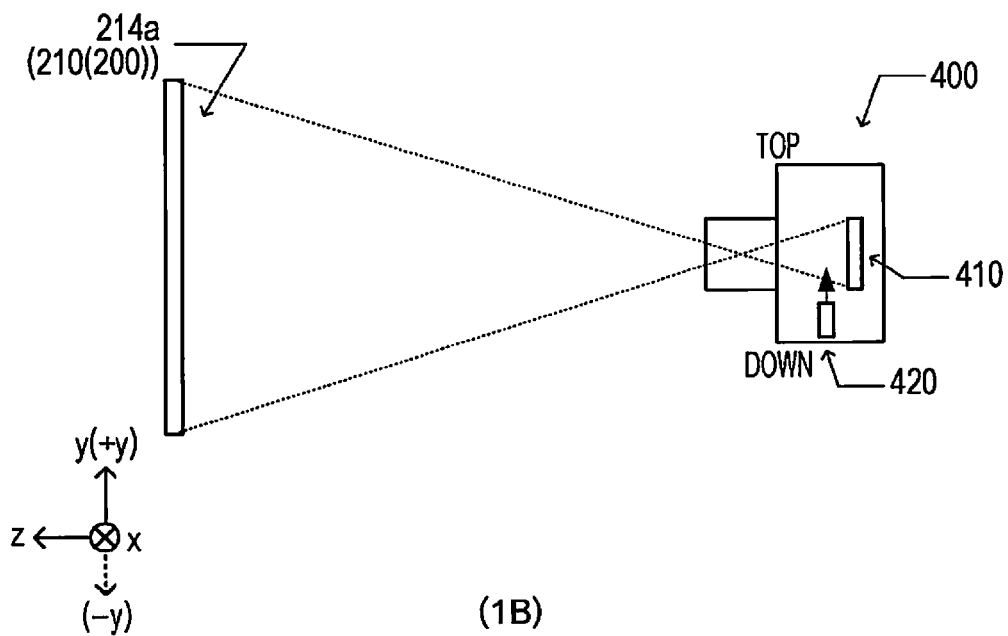
(1B)

FIG. 2
(2A)
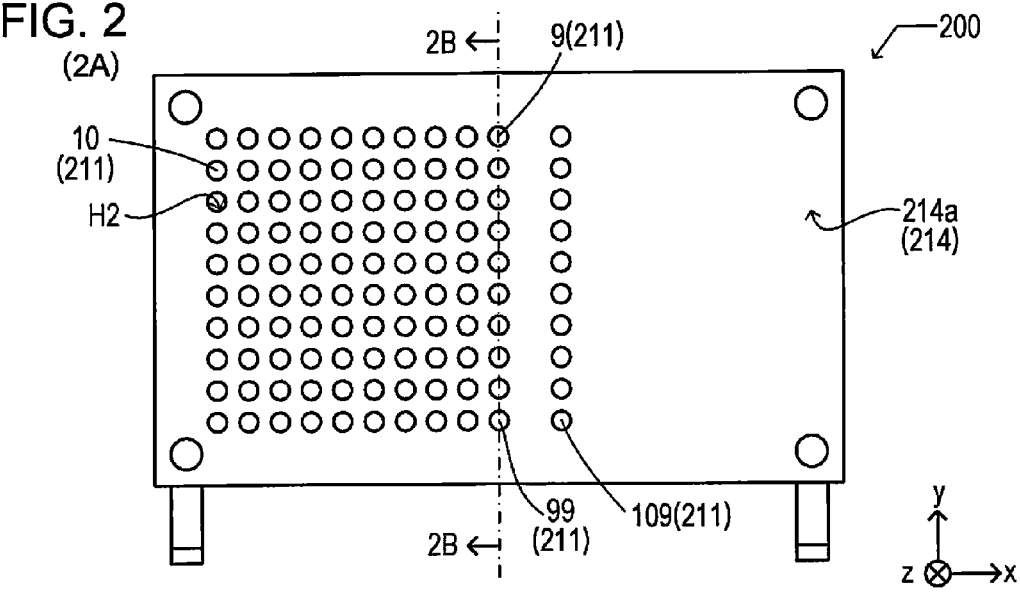
(2B)
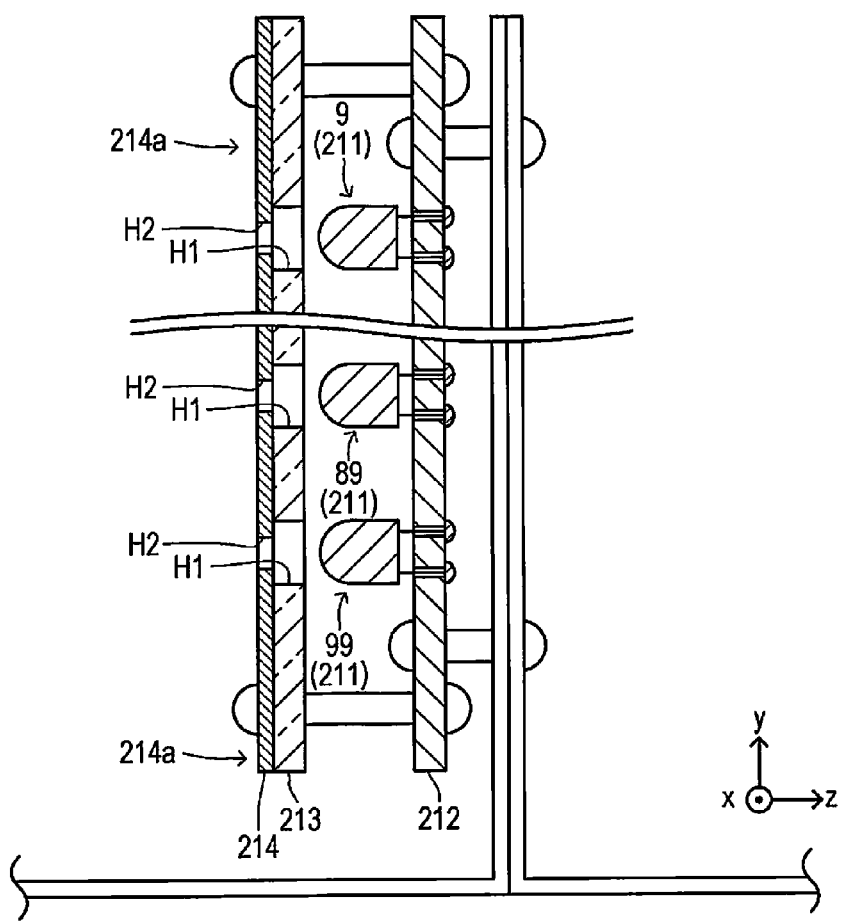

FIG. 3
(3A)
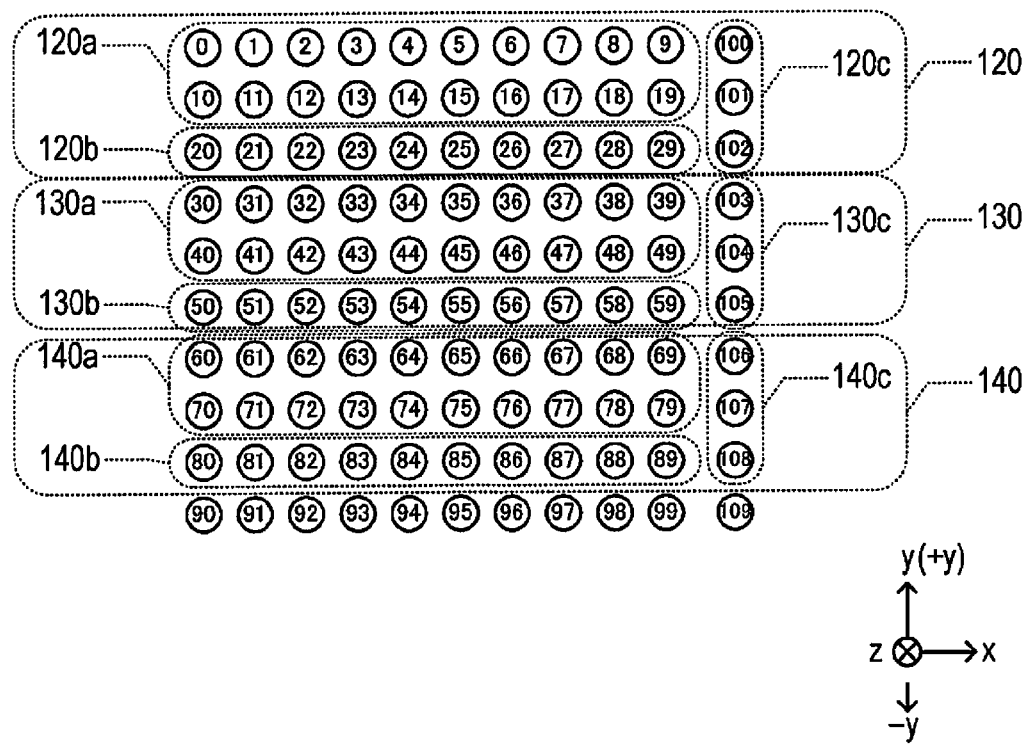
(3B)
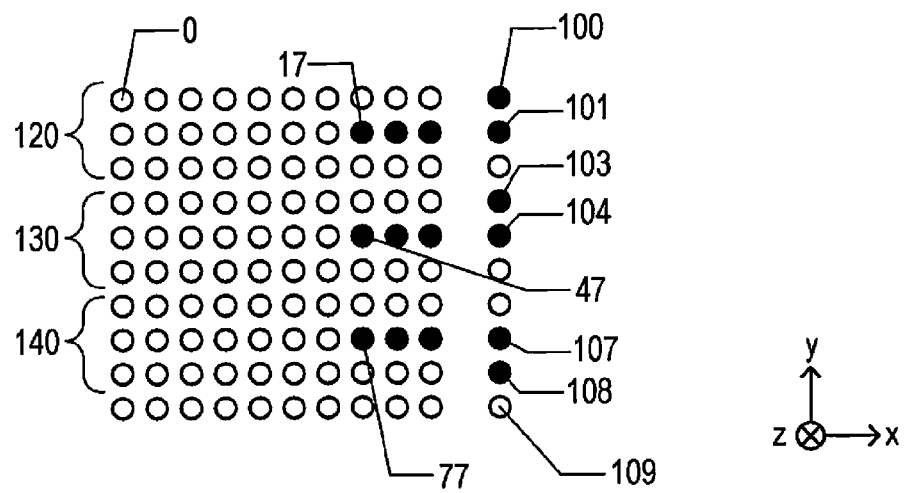

FIG. 7

0 [ms] ≥ t > 0.5 [ms]    m = 1, mm = 0, repeat = 0
00 TO 09  ○ ○ ○ ○ ○ ○ ○ ○ ○ ○  ○100
10 TO 19  ○ ○ ○ ○ ○ ○ ○ ● ●     ○101
20 TO 29  ○ ○ ○ ○ ○ ○ ○ ○ ○ ○  ○102
(7A)

4.0 [ms] ≥ t > 4.5 [ms]    m = 9, mm = 8, repeat = 0
00 TO 09  ○ ○ ○ ○ ○ ● ● ○ ○ ○  ○100
10 TO 19  ○ ○ ○ ○ ○ ○ ○ ○ ○ ○  ○101
20 TO 29  ○ ○ ○ ○ ○ ○ ○ ○ ○ ○  ○102
(7I)

0.5 [ms] ≥ t > 1.0 [ms]    m = 2, mm = 1, repeat = 0
00 TO 09  ● ○ ○ ○ ○ ○ ○ ○ ○ ○  ○100
10 TO 19  ○ ○ ○ ○ ○ ○ ○ ○ ● ●  ○101
20 TO 29  ○ ○ ○ ○ ○ ○ ○ ○ ○ ○  ○102
(7B)

4.5 [ms] ≥ t > 5.0 [ms]    m = 10, mm = 9, repeat = 0
00 TO 09  ○ ○ ○ ○ ○ ● ● ● ○ ○  ○100
10 TO 19  ○ ○ ○ ○ ○ ○ ○ ○ ○ ○  ○101
20 TO 29  ○ ○ ○ ○ ○ ○ ○ ○ ○ ○  ○102
(7J)

1.0 [ms] ≥ t > 1.5 [ms]    m = 3, mm = 2, repeat = 0
00 TO 09  ● ● ○ ○ ○ ○ ○ ○ ○ ○  ○100
10 TO 19  ○ ○ ○ ○ ○ ○ ○ ○ ○ ●  ○101
20 TO 29  ○ ○ ○ ○ ○ ○ ○ ○ ○ ○  ○102
(7C)

5.0 [ms] ≥ t > 5.5 [ms]    m = 11, mm = 10, repeat = 0
00 TO 09  ○ ○ ○ ○ ○ ○ ● ● ●     ○100
10 TO 19  ○ ○ ○ ○ ○ ○ ○ ○ ○ ○  ○101
20 TO 29  ○ ○ ○ ○ ○ ○ ○ ○ ○ ○  ○102
(7K)

1.5 [ms] ≥ t > 2.0 [ms]    m = 4, mm = 3, repeat = 0
00 TO 09  ● ● ● ○ ○ ○ ○ ○ ○ ○  ○100
10 TO 19  ○ ○ ○ ○ ○ ○ ○ ○ ○ ○  ○101
20 TO 29  ○ ○ ○ ○ ○ ○ ○ ○ ○ ○  ○102
(7D)

5.5 [ms] ≥ t > 6.0 [ms]    m = 12, mm = 11, repeat = 0
00 TO 09  ○ ○ ○ ○ ○ ○ ○ ● ●     ○100
10 TO 19  ● ○ ○ ○ ○ ○ ○ ○ ○ ○  ○101
20 TO 29  ○ ○ ○ ○ ○ ○ ○ ○ ○ ○  ○102
(7L)

2.0 [ms] ≥ t > 2.5 [ms]    m = 5, mm = 4, repeat = 0
00 TO 09  ○ ● ● ● ○ ○ ○ ○ ○ ○  ○100
10 TO 19  ○ ○ ○ ○ ○ ○ ○ ○ ○ ○  ○101
20 TO 29  ○ ○ ○ ○ ○ ○ ○ ○ ○ ○  ○102
(7E)

6.0 [ms] ≥ t > 6.5 [ms]    m = 13, mm = 12, repeat = 0
00 TO 09  ○ ○ ○ ○ ○ ○ ○ ○ ●     ○100
10 TO 19  ● ● ○ ○ ○ ○ ○ ○ ○ ○  ○101
20 TO 29  ○ ○ ○ ○ ○ ○ ○ ○ ○ ○  ○102
(7M)

2.5 [ms] ≥ t > 3.0 [ms]    m = 6, mm = 5, repeat = 0
00 TO 09  ○ ○ ● ● ● ○ ○ ○ ○ ○  ○100
10 TO 19  ○ ○ ○ ○ ○ ○ ○ ○ ○ ○  ○101
20 TO 29  ○ ○ ○ ○ ○ ○ ○ ○ ○ ○  ○102
(7F)

6.5 [ms] ≥ t > 7.0 [ms]    m = 14, mm = 13, repeat = 0
00 TO 09  ○ ○ ○ ○ ○ ○ ○ ○ ○ ○  ○100
10 TO 19  ● ● ● ○ ○ ○ ○ ○ ○ ○  ○101
20 TO 29  ○ ○ ○ ○ ○ ○ ○ ○ ○ ○  ○102
(7N)

3.0 [ms] ≥ t > 3.5 [ms]    m = 7, mm = 6, repeat = 0
00 TO 09  ○ ○ ○ ● ● ● ○ ○ ○ ○  ○100
10 TO 19  ○ ○ ○ ○ ○ ○ ○ ○ ○ ○  ○101
20 TO 29  ○ ○ ○ ○ ○ ○ ○ ○ ○ ○  ○102
(7G)

7.0 [ms] ≥ t > 7.5 [ms]    m = 15, mm = 14, repeat = 0
00 TO 09  ○ ○ ○ ○ ○ ○ ○ ○ ○ ○  ○100
10 TO 19  ○ ● ● ● ○ ○ ○ ○ ○ ○  ○101
20 TO 29  ○ ○ ○ ○ ○ ○ ○ ○ ○ ○  ○102
(7O)

3.5 [ms] ≥ t > 4.0 [ms]    m = 8, mm = 7, repeat = 0
00 TO 09  ○ ○ ○ ○ ● ● ○ ○ ○ ○  ○100
10 TO 19  ○ ○ ○ ○ ○ ○ ○ ○ ○ ○  ○101
20 TO 29  ○ ○ ○ ○ ○ ○ ○ ○ ○ ○  ○102
(7H)

7.5 [ms] ≥ t > 8.0 [ms]    m = 16, mm = 15, repeat = 0
00 TO 09  ○ ○ ○ ○ ○ ○ ○ ○ ○ ○  ○100
10 TO 19  ○ ○ ● ● ○ ○ ○ ○ ○ ○  ○101
20 TO 29  ○ ○ ○ ○ ○ ○ ○ ○ ○ ○  ○102
(7P)

FIG. 8

(8A) 8.0 [ms]≥t>8.5 [ms]   m=17, mm=16, repeat=0
00 TO 09  ○ ○ ○ ○ ○ ○ ○ ○ ○ ○ 100
10 TO 19  ○ ○ ○ ● ● ○ ○ ○ ○ ○ 101
20 TO 29  ○ ○ ○ ○ ○ ○ ○ ○ ○ ○ 102

(8B) 8.5 [ms]≥t>9.0 [ms]   m=18, mm=17, repeat=0
00 TO 09  ○ ○ ○ ○ ○ ○ ○ ○ ○ ○ 100
10 TO 19  ○ ○ ○ ● ● ● ○ ○ ○ ○ 101
20 TO 29  ○ ○ ○ ○ ○ ○ ○ ○ ○ ○ 102

(8C) 9.0 [ms]≥t>9.5 [ms]   m=19, mm=18, repeat=0
00 TO 09  ○ ○ ○ ○ ○ ○ ○ ○ ○ ○ 100
10 TO 19  ○ ○ ○ ○ ● ● ● ○ ○ ○ 101
20 TO 29  ○ ○ ○ ○ ○ ○ ○ ○ ○ ○ 102

(8D) 9.5 [ms]≥t>10.0 [ms]   m=20, mm=19, repeat=0
00 TO 09  ○ ○ ○ ○ ○ ○ ○ ○ ○ ○ 100
10 TO 19  ○ ○ ○ ○ ○ ● ● ● ○ ○ 101
20 TO 29  ○ ○ ○ ○ ○ ○ ○ ○ ○ ○ 102

(8E) 10.0 [ms]≥t>10.5 [ms]   m=1, mm=20, repeat=1
00 TO 09  ○ ○ ○ ○ ○ ○ ○ ○ ○ ● 100
10 TO 19  ○ ○ ○ ○ ○ ○ ● ● ● ○ 101
20 TO 29  ○ ○ ○ ○ ○ ○ ○ ○ ○ ○ 102

(8F) 20.0 [ms]≥t>20.5 [ms]   m=1, mm=40, repeat=2
00 TO 09  ○ ○ ○ ○ ○ ○ ○ ○ ○ ● 100
10 TO 19  ○ ○ ○ ○ ○ ○ ● ● ● ● 101
20 TO 29  ○ ○ ○ ○ ○ ○ ○ ○ ○ ○ 102

(8G) 30.0 [ms]≥t>30.5 [ms]   m=1, mm=60, repeat=3
00 TO 09  ○ ○ ○ ○ ○ ○ ○ ○ ○ ● 100
10 TO 19  ○ ○ ○ ○ ○ ○ ● ● ● ● 101
20 TO 29  ○ ○ ○ ○ ○ ○ ○ ○ ○ ● 102

(8H) 40.0 [ms]≥t>40.5 [ms]   m=1, mm=80, repeat=4
00 TO 09  ○ ○ ○ ○ ○ ○ ○ ○ ○ ○ 100
10 TO 19  ○ ○ ○ ○ ○ ○ ● ● ● ○ 101
20 TO 29  ● ○ ○ ○ ○ ○ ○ ○ ○ ○ 102

(8I) 50.0 [ms]≥t>50.5 [ms]   m=1, mm=100, repeat=5
00 TO 09  ○ ○ ○ ○ ○ ○ ○ ○ ○ ● 100
10 TO 19  ○ ○ ○ ○ ○ ○ ● ● ● ○ 101
20 TO 29  ● ○ ○ ○ ○ ○ ○ ○ ○ ○ 102

(8J) 80.0 [ms]≥t>80.5 [ms]   m=1, mm=160, repeat=8
00 TO 09  ○ ○ ○ ○ ○ ○ ○ ○ ○ ○ 100
10 TO 19  ○ ○ ○ ○ ○ ○ ● ● ● ○ 101
20 TO 29  ● ● ○ ○ ○ ○ ○ ○ ○ ○ 102

(8K) 120.0 [ms]≥t>120.5 [ms]   m=1, mm=240, repeat=12
00 TO 09  ○ ○ ○ ○ ○ ○ ○ ○ ○ ○ 100
10 TO 19  ○ ○ ○ ○ ○ ○ ● ● ● ○ 101
20 TO 29  ● ● ● ○ ○ ○ ○ ○ ○ ○ 102

(8L) 160.0 [ms]≥t>160.5 [ms]   m=1, mm=320, repeat=16
00 TO 09  ○ ○ ○ ○ ○ ○ ○ ○ ○ ○ 100
10 TO 19  ○ ○ ○ ○ ○ ○ ● ● ● ○ 101
20 TO 29  ● ● ● ● ○ ○ ○ ○ ○ ○ 102

(8M) 200.0 [ms]≥t>200.5 [ms]   m=1, mm=400, repeat=20
00 TO 09  ○ ○ ○ ○ ○ ○ ○ ○ ○ ○ 100
10 TO 19  ○ ○ ○ ○ ○ ○ ● ● ● ○ 101
20 TO 29  ● ● ● ● ● ○ ○ ○ ○ ○ 102

(8N) 240.0 [ms]≥t>240.5 [ms]   m=1, mm=480, repeat=24
00 TO 09  ○ ○ ○ ○ ○ ○ ○ ○ ○ ○ 100
10 TO 19  ○ ○ ○ ○ ○ ○ ● ● ● ○ 101
20 TO 29  ● ● ● ● ● ● ○ ○ ○ ○ 102

(8O) 360.0 [ms]≥t>360.5 [ms]   m=1, mm=720, repeat=36
00 TO 09  ○ ○ ○ ○ ○ ○ ○ ○ ○ ○ 100
10 TO 19  ○ ○ ○ ○ ○ ○ ● ● ● ○ 101
20 TO 29  ● ● ● ● ● ● ● ● ● ○ 102

(8P) 439.5 [ms]≥t>440 [ms]   m=20, mm=879, repeat=43
00 TO 09  ○ ○ ○ ○ ○ ○ ○ ○ ○ ● 100
10 TO 19  ○ ○ ○ ○ ○ ● ● ● ● ○ 101
20 TO 29  ● ● ● ● ● ● ● ● ● ● 102

FIG. 9
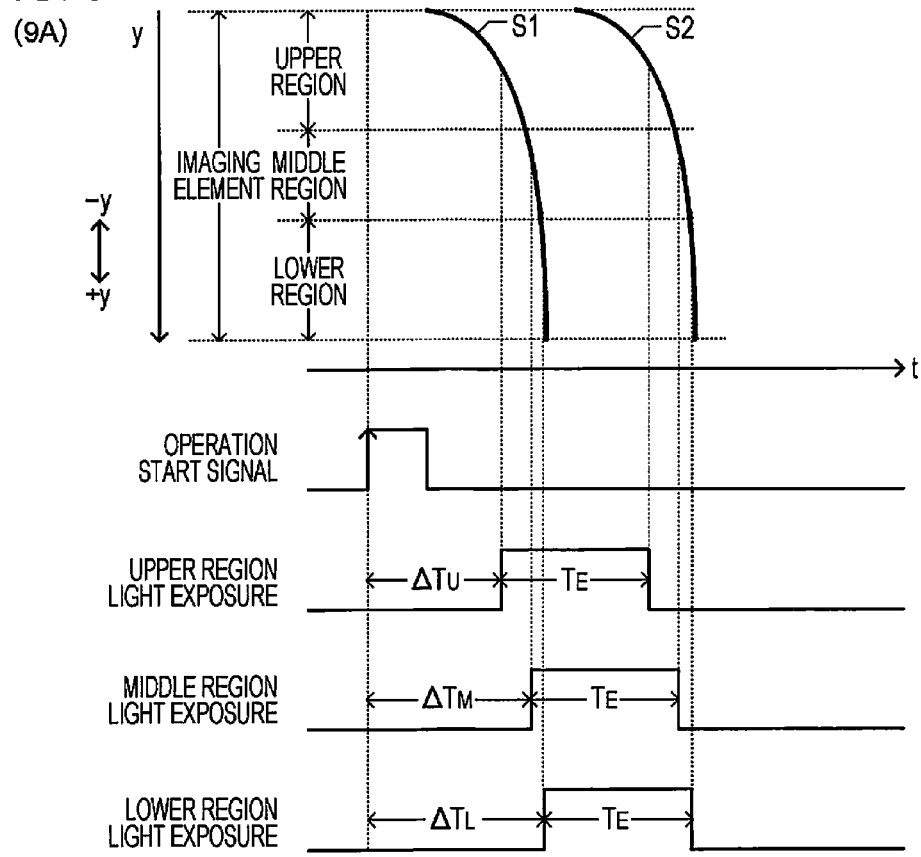
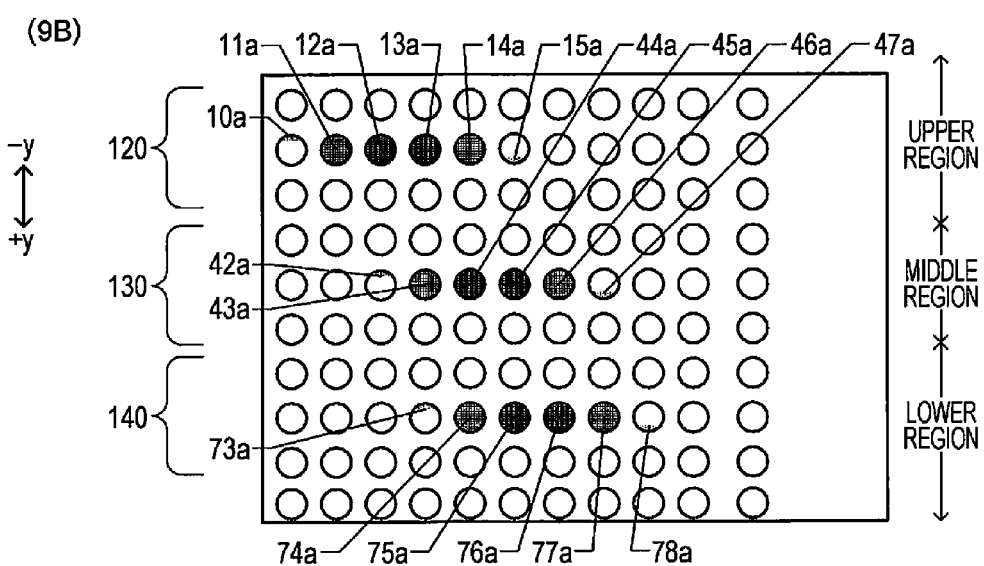

FIG. 11
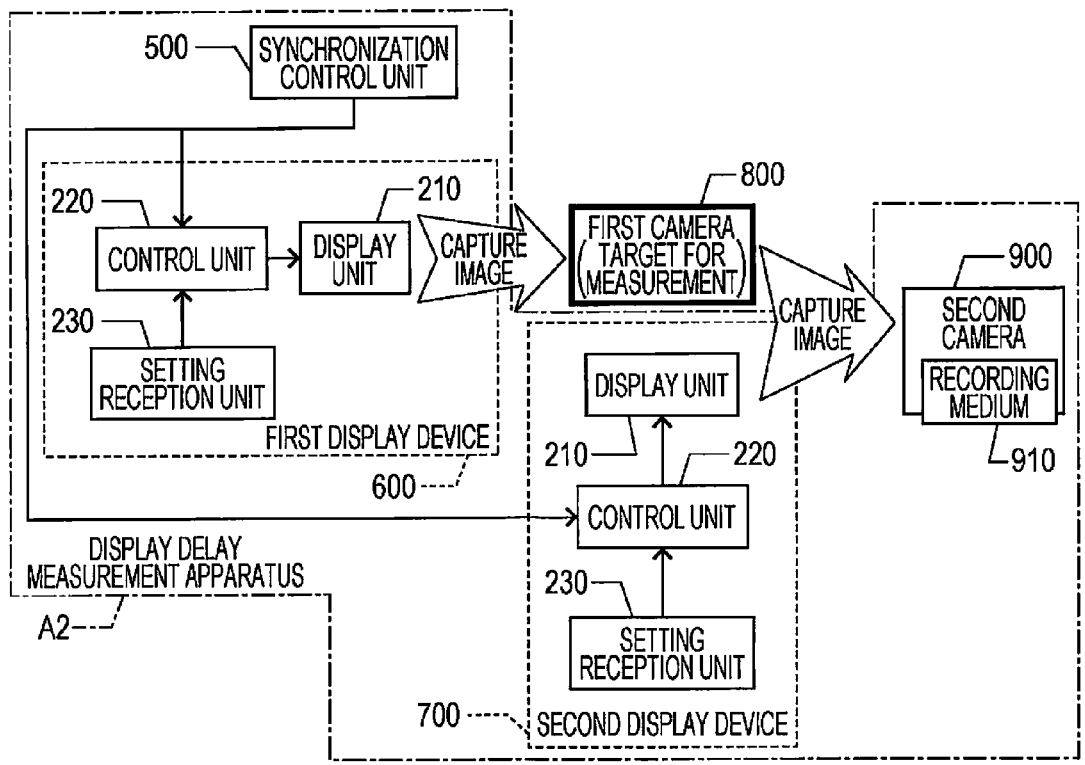
(11A)
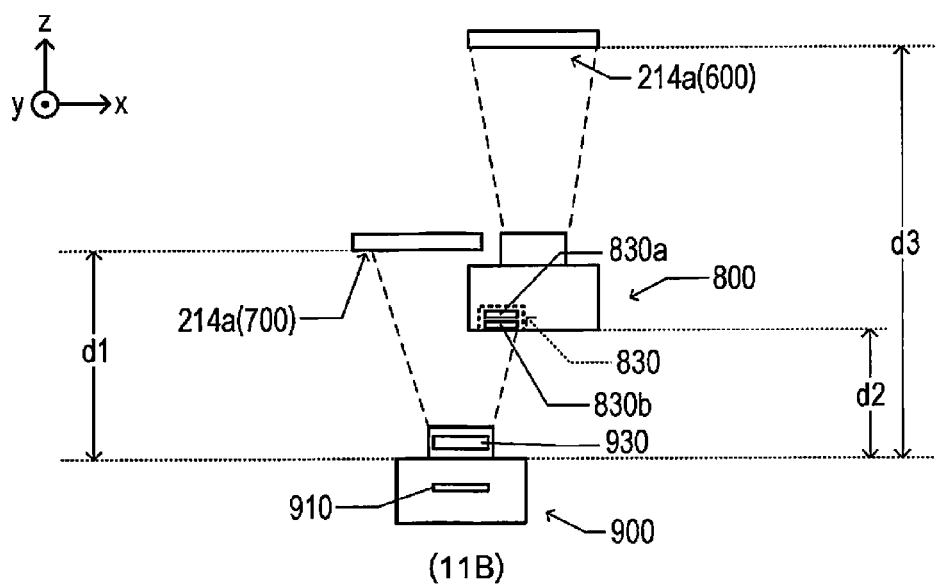
(11B)

FIG. 13
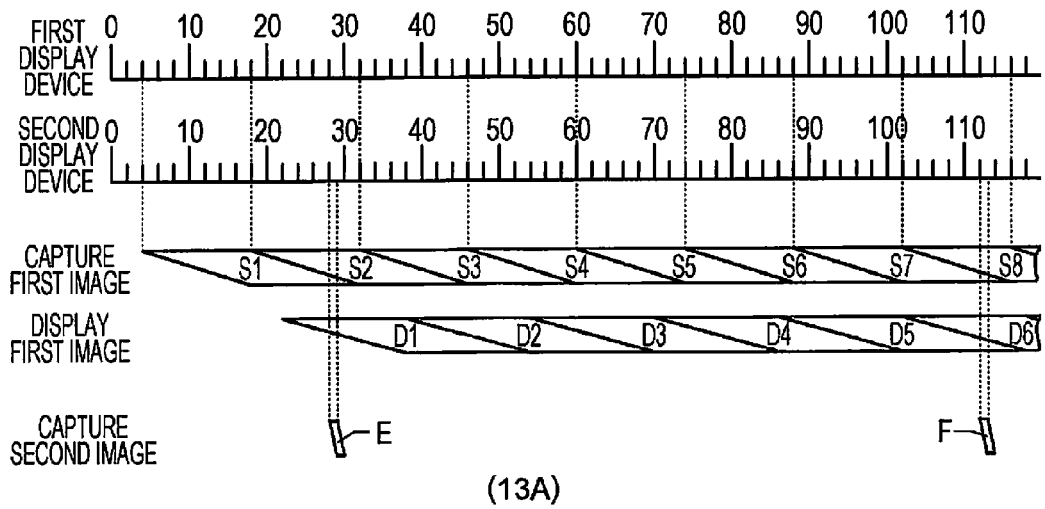
(13A)
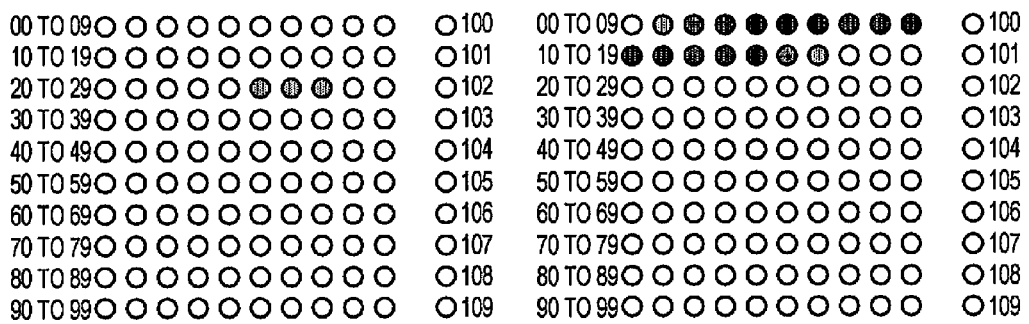
(13B)  (13C)
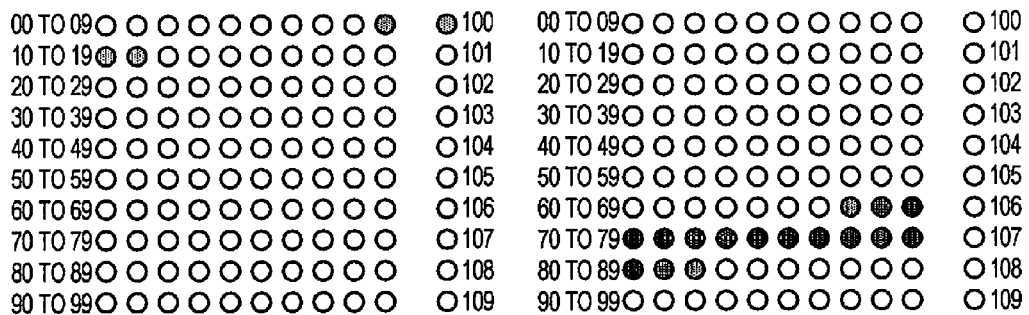
(13D)  (13E)

FIG. 14
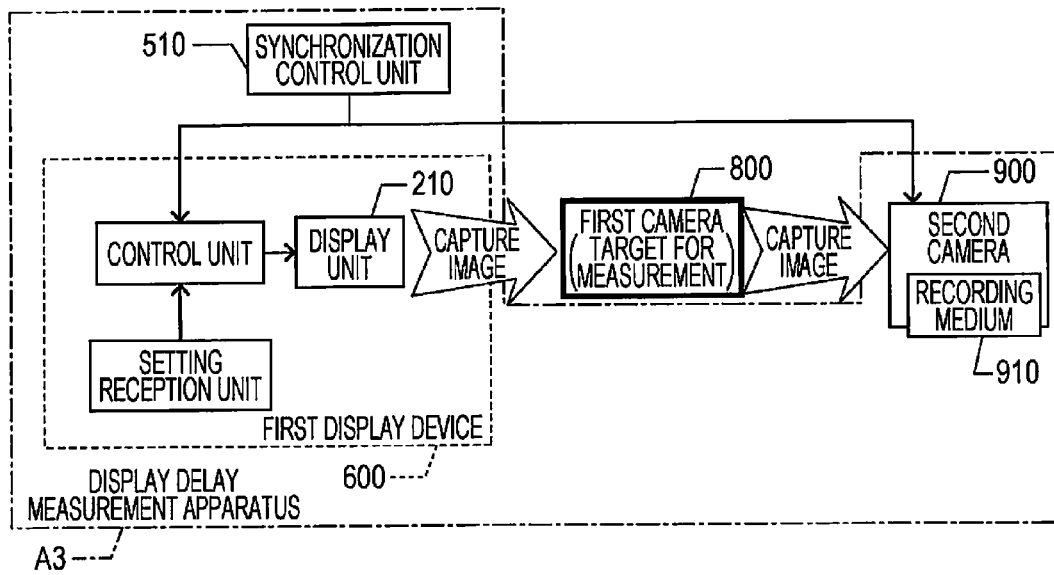
(14A)
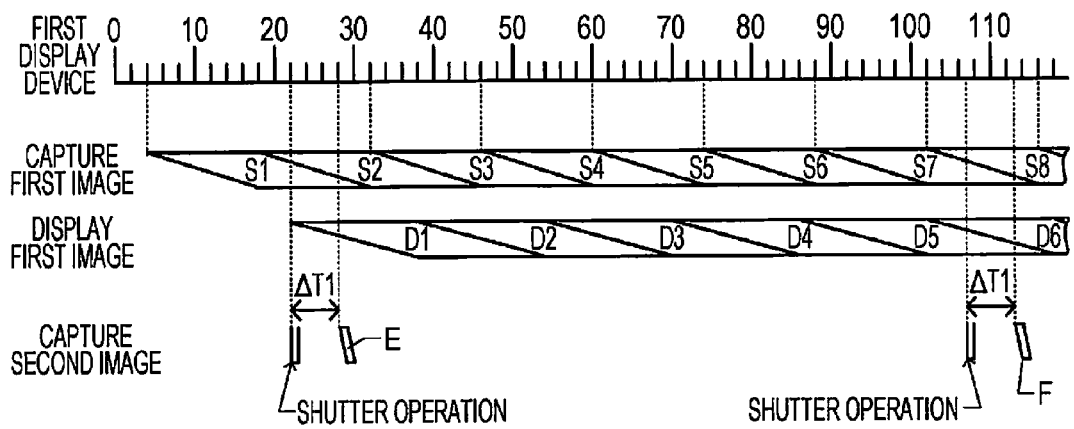
(14B)

METHOD OF MEASURING SHUTTER TIME LAG, DISPLAY DEVICE FOR MEASURING SHUTTER TIME LAG, SHUTTER TIME LAG MEASUREMENT APPARATUS, METHOD OF MANUFACTURING CAMERA, METHOD OF MEASURING DISPLAY DELAY OF CAMERA, AND DISPLAY DELAY MEASUREMENT APPARATUS

TECHNICAL FIELD

The present invention relates to a method of measuring the shutter time lag of a camera, a display device for measuring a shutter time lag, a shutter time lag measurement apparatus, a method of manufacturing a camera, a method of measuring the display delay of a camera, and a display delay measurement apparatus.

BACKGROUND ART

In the related art, a display device for measuring the shutter time lag of a camera is known (for example, NPL 1). In the display device disclosed in NPL 1, one turned-on LED sequentially switches among 100 LEDs at every predetermined time $T_D$. That is, when the time $T_D$ elapses after an x-th (x is a natural number and $1 \leq x \leq 100$) LED turns on and other LEDs turn off, the x-th LED turns off, and x+1-th LED turns on (LEDs other than the x+1-th LED turn off). As described above, the display device disclosed in NPL 1 starts the switching of a turned-on LED at every time $T_D$ in synchronization with the pressing down of a release button of the camera that is a target for measurement. It is possible to capture the images of the display device using the camera (the target for measurement) during the switching operation, and to deduce a shutter time lag from the pressing down of the release button to the image capturing based on the captured images. Specifically, it is possible to determine a turned-on sequence of the turned-on LEDs in the captured images, and to calculate the shutter time lag as the turned-on sequence x the time $T_D$.

CITATION LIST

Non Patent Literature

NPL 1: "LED-PANEL", [online], Image Engineering Co. (Image Engineering GmbH & Co. KG), [retrieved on Jun. 8, 2012], Internet <http://www.image-engineering.de/images/downloads/manuals/measurement_devices/led_panel_EN.pdf>

SUMMARY OF INVENTION

Technical Problem

In the display device disclosed in NPL 1, one LED among 100 LEDs turns on at the same time, and the time $T_D$ is the time for which an arbitrary x-th LED turns on continuously. The time $T_D$ is equivalent to the minimum unit of the shutter time lag, which can be measured using the display device. The time $T_D$ is preferably reduced so as to increase accuracy of measurement of the shutter time lag (to acquire a high resolution). The reduction of the time $T_D$ implies that a turn-on time of an LED is reduced. In a case where the brightness of an LED is not changeable, when the turn-on time of the LED is short, the camera records a turned-on LED as being dark. For this reason, there is a problem in that when the accuracy of measurement of the shutter time lag is increased, it is difficult to identify the turned-on LED in the captured image. This is a common problem even when another display element than an LED is used on the display device. The present invention is made in light of this problem, and an object of the present invention is to easily measure a shutter time lag of a camera.

When live view images are displayed on an electronic view finder (EVF) of the camera, the motions of a photographic subject on the EVF are displayed while being delayed from actual motions of the photographic subject. A method of measuring such a display delay is not specifically disclosed in NPL 1. The present invention is made in light of this problem, and an object of the present invention is to measure a display delay time when an image captured by a camera is displayed in a live view mode on a display unit of the camera.

Solution to Problem

According to an aspect of the present invention to achieve the object, there is provided a method of measuring a shutter time lag including a first step, a second step, and a third step. In the first step, a display pattern is displayed on a display unit including i (i is a natural number greater than 2) display elements by bringing the display elements into a first display state or a second display state, and a switching operation of sequentially switching the display pattern is executed whenever a pattern continuation time $T_P$ has elapsed. Here, the display elements can adopt various configurations insofar as the respective display states of the display elements can be individually changed. For example, a light emitting element such as an LED may be used as the display element. Alternatively, an element may be used as the display element, which does not emit light by itself and changes a display state by changing reflectivity. The first display state is defined as a display state observed as being brighter than the second display state. For example, when the former is used as the display element, the former emits light more brightly in the first display state than in the second display state, and when the latter is used as the display element, the reflectivity is higher in the first display state than in the second display state. For example, an element may be used as another display element, which switches a color between two or more colors. For example, an element such as a MEMS may be used, which switches a display state by changing a mechanical shape in response to electric signals.

The switching operation refers to an operation of sequentially switching a plurality of different types of display patterns whenever the pattern continuation time $T_P$ has elapsed. The sequence is predetermined in which the plurality of types of display patterns are displayed, and the switching operation from an arbitrary m-th display pattern to the (m+1)-th display patter is specified as follows. First, in the m-th display pattern, among i display elements, j (j is a natural number, and $1 \leq j < i$) display elements are brought into the first display state, and (i−j) display elements other than j display elements in the first display state are brought into the second display state observed as being darker than the first display state. At this time, in the (m+1)-th display pattern, k (k is a natural number, and $0 < k \leq j$) display elements are brought into the second display state among j display elements in the first display state in the m-th display pattern, and k display elements are brought into the first display state among (i−j) display elements in the second display state in the m-th display pattern. The pattern continuation time $T_P$ may be or may not be constant. When the pattern continuation time $T_P$ is not constant, the continuation time of an arbitrary m-th display pattern is required to be apparent so as to deduce a shutter time lag in the third step.

In second step, a camera as being a target for measurement captures an image of the display unit executing the switching operation, in response to a shutter operation of the camera performed in synchronization with the switching operation. During the time period for which the second step is executed, the first step is executed while overlapping the second step. The shutter operation is preferably performed in synchronization with the switching operation. For example, the switching operation may start in synchronization with the shutter operation. In addition, when the switching operation has already started, and is sequentially performed whenever the pattern continuation time $T_P$ has elapsed, the shutter operation may be performed in synchronization with the execution of the switching operation. In the latter case, it is necessary to be able to specify the number of execution times of the switching operation when the shutter operation is performed (the display sequence of the display patterns switched when the shutter operation is performed).

In the third step, the shutter time lag taken from the shutter operation to the imaging of the display unit is deduced from the image captured by the camera. The image captured by the camera (a target for measurement) contains the display unit, and it is possible to specify the display patterns that the display unit displays during a light exposure period from the start of light exposure of the camera to the end of light exposure. When the pattern continuation time $T_P$ is shorter than the light exposure period, a plurality of display patterns are imprinted in the image. The content of each display pattern and the sequence of the display patterns are predetermined. That is, in an arbitrary m-th display pattern, the display element being in the first display state and the display elements being in the second display state are predetermined. For this reason, in a case where it is possible to specify a display state of each of the display elements of the display unit from the image, it is possible to specify the display patterns imprinted in the image and the sequence of the display patterns. It is possible to specify the display patterns displayed from the shutter operation to the start of the light exposure of the camera, based on the sequence of the display patterns that a display device displays during the shutter operation in the second step, and the sequence of the display patterns imprinted in the image. It is possible to deduce the shutter time lag by adding the pattern continuation time of each of the display patterns displayed from the shutter operation to the start of light exposure of the camera. An operator may manually deduce the shutter time lag based on the image, and may deduce the shutter time lag using a computer that executes an image processing program for specifying display patterns imprinted in an image.

When the switching operation is sequentially executed, (j−k) display elements are continuously in the first display state across at least two display patterns that are displayed successively in time. When the pattern continuation time $T_P$ is constant, (j−k) display elements can be continuously in the first display state during the time expressed by at least $2T_P$. Compared to when a continuation time of the first display state of the display element is the pattern continuation time $T_P$, in the configuration of the present invention, it is possible to increase the continuation of the first display state. When the pattern continuation time $T_P$ is set to be shorter than the light exposure period (shutter speed) of the camera, the plurality of display patterns are sequentially displayed during the light exposure period. For this reason, the plurality of display patterns are imprinted in the captured image. When the display elements are continuously in the first display state across at least two display patterns displayed successively in time, the display elements being continuously in the first display state across at least the time $2T_P$ during the light exposure period are imprinted as being bright, compared to the display elements in the first display state during the light exposure period in the configuration in which the continuation time of the first display state is the pattern continuation time $T_P$. For this reason, it is easy to identify the display element in the first display state from the captured image, and it is easy to specify the display patterns imprinted in the image. As a result, it is easy to deduce the shutter time lag of the camera.

In the method of measuring a shutter time lag to achieve the object of the present invention. In this case, the first display state may be a turn-on state, and the second display state may be a turn-off state.

In at least two display patterns displayed successively in time, when the display elements are continuously in a turn-on state, the display elements can be imprinted as being bright in the captured image. As a result, it is possible to easily identify the display element, and it is possible to easily specify the display patterns imprinted in the image. Since contrast between the display elements continuously in a turn-on state and the display elements continuously in a turn-off state increases further to the extent that the continuation of a turn-on state increases, it is easy to identify a display state of each of the display elements.

In the method of measuring a shutter time lag to achieve the object of the present invention, in the switching operation, k display elements selected may be brought into the second display state, k display elements being sequentially selected in a descending order of the length of the first display state among j display elements in the first display state in the m-th display pattern.

That is, at this time, when attention is paid to an arbitrary display element, a continuation time of the first display state of the display element is $(jT_P/k)$. Accordingly, since in an arbitrary display pattern, the number of display elements in the first display state is one, and the time $(jT_P/k)$ an arbitrary display element is continuously in the first display state is greater than the pattern continuation time $T_P$, in the configuration of the present invention, a continuation time of the first display state of the display element increases. When the display elements are continuously in the first display state during the time expressed by $(jT_P/k)$, the display elements can be imprinted as being bright in the captured image. As a result, it is possible to easily identify the display element, and it is possible to easily specify the display patterns imprinted in the image.

The method of measuring a shutter time lag to achieve the object of the present invention further may include a preparation step of setting at least one of i, j, k, and $T_P$ prior to the first step.

It is possible to increase and decrease the number of types of a display pattern by increasing and decreasing i. It is possible to increase and decrease the continuation time $(jT_P/k)$ of the first display state by increasing and decreasing j, k, and $T_P$. Accordingly, when the set values of these parameters are changed, in response to various conditions such as imaging conditions (a shutter speed or the like) of the camera (a target for measurement), it is possible to adjust the turn-on time or the number of types of a display pattern in such a manner that the display pattern is imprinted in an image in a state where the display pattern is easily identified.

In the method of measuring a shutter time lag to achieve the object of the present invention, when a continuation time of the first state of the display elements is set to a predetermined shortest time T, at least one of $T_P$, j, and k may be set in such a manner that $T_P$j/k is greater than or equal to T.

It is possible to further increase the resolution of measurement of a shutter time lag to the extent that the pattern continuation time $T_P$ is decreased; however, since a continuation time of the first display state of an arbitrary display element is further decreased to the extent that the pattern continuation time $T_P$ is decreased, the image of the display element in the first display state during the light exposure period of the camera is captured as being dark. As a result, it is not easy to identify the display element in the first display state during the light exposure period of the camera. When the value of the parameter j or k is changed in such a manner that the value of (j/k) is increased to the extent that the value of $T_P$ is set to be small, it is possible to increase a continuation time of the first display state of an arbitrary display element. As a result, the image of a display element in the first display state during the light exposure period of the camera can be captured as being bright, and it is possible to easily identify the display element. When it is necessary to easily identify the display element, the value of ($T_P$j/k) is set in such a manner as to be the predetermined shortest time T or greater (the shortest time in response to imaging conditions of the camera or imaging environment) required to imprint the image (image having predetermined brightness) of the display element in the image, and thereby it is possible to easily identify the display element in the first display state during the light exposure period of the camera.

In the control unit of the display device used in the method of measuring a shutter time lag to achieve the object of the present invention, the display patterns switched by the switching operations may be different from each other during a time period from the shutter operation to the end of light exposure of the camera.

For example, when the time expressed by (the maximum number of display patterns x the pattern continuation time $T_P$) is shorter than time from the shutter operation to the light exposure of the camera, the same display pattern is repeatedly displayed during the time from the shutter operation to the light exposure of the camera. When the light exposure time of the camera overlaps the time period for which there is a possibility that a display pattern is repeatedly displayed, it is not possible to uniquely specify the shutter time lag from the image. For this reason, the display unit displays different display patterns during the time from the shutter operation to the light exposure of the camera, and thereby it is possible to uniquely specify the shutter time lag from the image. The display unit may include h (h is a natural number) display elements in addition to i display elements, and the respective display states of h display elements may be changed whenever the display patterns are completely displayed by the maximum number of display patterns displayed by i display elements. That is, h display elements may illustrate the number of times when the display patterns are completed displayed by the maximum number of display patterns displayed by i display elements. As a result, the number of different patterns expressed by i display elements and j display elements increases, and the time for displaying the different display patterns increases. When the camera captures an image while an imaging range contains i display elements and h display elements, an operator can uniquely specify the shutter time lag of the camera from the image.

According to another aspect of the present invention to achieve the object, there is provided a method of measuring a shutter time lag including a first step, a second step, and a third step. In the first step, in each of groups into which a plurality of display elements of a display unit are divided in such a manner that the display elements close to each other in a predetermined direction are grouped into the same group, a display pattern is formed by bringing i (i is a natural number greater than 2) first type display elements of each of the groups into a first display state or a second display state, and a switching operation of switching the display pattern is sequentially and synchronously executed for each of the groups whenever a pattern continuation time $T_P$ has elapsed. In the first step, h (h is a natural number) second type display elements of each of the groups displays progress of the switching operation by the first type display elements of the group.

That is, each of the groups includes i first type display elements and h second type display elements. The predetermined direction implies a direction parallel to a movement direction of a shutter of the camera that is a target for measurement. The display elements are grouped in such a manner that the same group contains i first type display elements and h second type display elements close to each other in the predetermined direction. The switching operations by the first type display elements of the groups are synchronously performed, and the second type display elements of each of the groups displays progress of the switching operation of the group. Here, the display elements (the first type display element and the second type display element) can adopt various configurations insofar as the respective display states can be individually changed. For example, a light emitting element such as an LED may be used as the display element. Alternatively, an element may be used as the display element, which does not emit light by itself and changes a display state by changing reflectivity. The first display state is defined as a display state observed as being brighter than the second display state. For example, when the former is used as the display element, the former emits light more brightly in the first display state than in the second display state, and when the latter is used as the display element, the reflectivity is higher in the first display state than in the second display state. For example, an element may be used as another display element, which switches a color between two or more colors. For example, an element such as a MEMS may be used, which switches a display state by changing a mechanical shape in response to electric signals.

The switching operation refers to an operation of sequentially switching a plurality of different types of display patterns whenever the pattern continuation time $T_P$ has elapsed. The sequence is predetermined in which the plurality of types of display patterns are displayed, and the switching operation from an arbitrary m-th display pattern to the (m+1)-th display patter is specified as follows. First, in the m-th display pattern, among i first type display elements, j (j is a natural number, and 1≤j≤i) first type display elements are brought into the first display state, and (i−j) first type display elements other than j first type display elements in the first display state are brought into the second display state observed as being darker than the first display state. At this time, in the (m+1)-th display pattern, k (k is a natural number, and 0<k≤j) first type display elements are brought into the second display state among j first type display elements in the first display state in the m-th display pattern, and k first type display elements are brought into the first display state among (i−j) first type display elements in the second display state in the m-th display pattern. The pattern continuation time $T_P$ may be or may not be constant. When the pattern continuation time $T_P$ is not constant, the continuation time of an arbitrary m-th display pattern is required to be apparent so as to deduce a shutter time lag in the third step.

h second type display elements of each of the groups displays progress of the switching operation by the first type display elements of the group to which the second type display elements belong. It is possible to display a predetermined number of different display patterns using i first type display elements. When the pattern continuation time $T_P$ is constant, the time measurable by switching a predetermined number of the display patterns at every the pattern continuation time $T_P$ is (a predetermined number×$T_P$). A display state of any one of h second type display elements are switched whenever a predetermined number of the display patterns are completely displayed by the first type display elements, and thereby it is possible to measure the time longer than (a predetermined number×$T_P$) using i first type display elements and j second type display elements.

In second step, a camera as being a target for measurement captures an image of the display unit executing the first step, in response to a shutter operation of the camera performed in synchronization with the switching operation. The camera is disposed with respect to the display unit in such a manner that a movement direction of a shutter is parallel to the predetermined direction. During the time period for which the second step is executed, the first step is executed while overlapping the second step. The shutter operation is preferably performed in synchronization with the switching operation. For example, the switching operation may start in synchronization with the shutter operation. In addition, when the switching operation has already started, and is sequentially performed whenever the pattern continuation time $T_P$ has elapsed, the shutter operation may be performed in synchronization with the execution of the switching operation. In the latter case, it is necessary to be able to specify the number of execution times of the switching operation when the shutter operation is performed (the display sequence of the display patterns switched when the shutter operation is performed).

In the third step, the shutter time lag for each group is deduced from the image captured by the camera. The image captured by the camera (a target for measurement) contains the display unit, and it is possible to specify the display patterns of each of the groups displayed during a light exposure period from the start of light exposure of the camera to the end of light exposure from the image. When the pattern continuation time $T_P$ is shorter than the light exposure period, a plurality of display patterns are imprinted in the image. In each of the groups, the content of each display pattern and the sequence of the display patterns are predetermined. That is, in an arbitrary m-th display pattern of an arbitrary group, the display element being in the first display state and the display elements being in the second display state are predetermined. For this reason, in a case where it is possible to specify a display state of each of the display elements from the image, it is possible to specify the display patterns imprinted in the image and the sequence of the display patterns for each of the groups. It is possible to specify the display patterns displayed from the shutter operation to the start of the light exposure of regions (region respectively corresponding to the groups) of an imaging element of the camera, based on the sequence of the display patterns when the shutter operation is performed in the second step, and the sequence of the display patterns imprinted in the image. It is possible to deduce the shutter time lag for a plurality of positions in the movement direction of the shutter of the camera (a target for measurement) by adding the pattern continuation time of each of the display patterns displayed from the shutter operation to the start of light exposure of the regions. An operator may manually deduce the shutter time lag based on the image, and may deduce the shutter time lag using a computer that executes an image processing program for specifying display patterns imprinted in an image.

When the switching operation of each of the groups is sequentially executed, (j−k) first type display elements are continuously in the first display state across at least two display patterns that are displayed successively in time. When the pattern continuation time $T_P$ is constant, (j−k) first type display elements can be continuously in the first display state during the time expressed by at least $2T_P$. Compared to when a continuation time of the first display state of the first type display element is the pattern continuation time $T_P$, in the configuration of the present invention, it is possible to increase the continuation of the first display state. When the pattern continuation time $T_P$ is set to be shorter than the light exposure period (shutter speed) of the camera, the plurality of display patterns are sequentially displayed during the light exposure period. For this reason, the plurality of display patterns are imprinted in the captured image. When the first type display elements are continuously in the first display state across at least two display patterns displayed successively in time, the first type display elements being continuously in the first display state across at least the two display patterns during the light exposure period are imprinted as being bright, compared to the configuration in which the continuation time of the first display state is the pattern continuation time $T_P$. For this reason, it is easy to identify the first type display element in the first display state from the captured image, and it is easy to specify the display patterns imprinted in the image. As a result, it is easy to deduce the shutter time lag of the camera.

In the configuration of the present invention, each of the groups divided in the movement direction of the shutter contains the second type display elements. For this reason, it is possible to clearly specify progress of the switching operation of each of the groups. When each of the groups does not contain h second type display elements, and all of the groups share h second type display elements, the following problem occurs. For example, it is assumed that the first type display elements are divided into nine groups of first to ninth groups in the sequence of an early time schedule from the start of the light exposure to the end of the light exposure, and h second type display elements shared by all of the groups are positioned behind the ninth group in terms of the time schedule from the start of the light exposure to the end of the light exposure. The respective display states of h second type display elements shared by all of the groups are changed whenever a predetermined number of the display patterns formed by i first type display elements of each of the groups are completely displayed (one set of the display patterns is completely displayed). Here, when the time (the predetermined number×$T_P$) required to display one set of the display patterns using the first type display elements is shorter than a differential time from the light exposure start time of a region of the imaging element corresponding to the first group to the light exposure start time of a region of the imaging element corresponding to the ninth group, the display pattern of each of the groups does not necessarily correspond to progress expressed by the second type display elements. For this reason, it is not possible to clearly specify the shutter time lag for each of the groups from the captured image.

For example, more specifically, in the first group, light exposure is performed before one set of the display patterns is completely deployed, and in the ninth group, light exposure is performed after one set of the display patterns is completely displayed. Since the second type display elements are positioned so as to be involved in light exposure later than the ninth group, the second type display elements are involved in light exposure while displaying that one set of the display patterns of the groups is completely displayed. From the image captured in this manner, it is not possible to clearly specify whether the display pattern of the first group belongs to a second set of the display patterns or a first set of the display patterns. In contrast, even in this case, when each group includes the second type display elements indicative of progress of the switching operation for each group formed by the display elements close to each other in the predetermined direction as in the configuration of the present invention, the sequence of a display pattern in each group in display of the display patterns can be clearly determined from the image.

A display device for measuring a shutter time lag to achieve the object of the present invention includes a display unit and a control unit. The display unit includes i (i is a natural number greater than 2) display elements. The control unit sequentially executes a switching operation at every the pattern continuation time $T_P$.

For this reason, it is easy to specify the respective display states of the display elements from the image obtained by capturing an image of the display unit of the display device for measuring a shutter time lag of the present invention with the camera (a target for measurement), compared to the image obtained by capturing the display device that performs the switching operation in such a manner that a continuation time of the first display state of the display element becomes the pattern continuation time $T_P$. As a result, it is easy to identify the display patterns imprinted in the image.

A shutter time lag measurement apparatus to achieve the object of the present invention includes the display device for measuring a shutter time lag and a synchronization control unit. The synchronization control unit synchronizes a switching operation with a shutter operation of a camera that is a target for measurement.

Since the display device for measuring a shutter time lag of the present invention includes the synchronization control unit, it is possible to highly accurately synchronize the switching operation of the display device for measuring a shutter time lag with the shutter operation of the camera (a target for measurement), compared to when an operator (a human) operates a shutter of the camera (a target for measurement) while the shutter operation is synchronized with the switching operation of the display device for measuring a shutter time lag. The synchronization control unit may adopt any configuration insofar as the synchronization control unit can synchronize the switching operation with the shutter operation. For example, the display unit may be configured in such a manner as to send an instruction of the shutter operation to the camera in synchronization with the switching operation of the display unit, or the display unit may be configured in such a manner as to start the switching operation in response to the shutter operation of the camera by an operator. For example, the display unit may be configured in such a manner as to start the switching operation and performs the shutter operation of the camera in response to an operation of an apparatus by an operation which is provided separately from the display unit and the camera.

A display device for measuring a shutter time lag to achieve the object of the present invention includes a display unit, and a control unit. The display unit includes a plurality of display elements. As described above, the control unit sequentially performs a switching operation and displays progress of the switching operation for each group whenever a pattern continuation time $T_P$ has elapsed while the groups are synchronized with each other.

For this reason, it is easy to specify the respective display states of the display elements from the image obtained by capturing an image of the display unit of the display device for measuring a shutter time lag of the present invention with the camera (a target for measurement), compared to the image obtained by capturing the display device that performs the switching operation in such a manner that a continuation time of the first display state of the display element becomes the pattern continuation time $T_P$. As a result, it is easy to identify the display patterns imprinted in the image. When the image of the display unit is captured in a state where the camera is installed in such a manner that a predetermined direction (a direction of line-up of groups) in the display unit is parallel to a movement direction of a shutter of the camera (a target for measurement), it is possible to measure the respective shutter time lags for a plurality of regions (respectively corresponding to the groups) divided in a direction parallel to the movement direction of the shutter.

A method of manufacturing a camera to achieve the object of the present invention includes a fourth step in addition to a first step, a second step, and a third step in the method of measuring a shutter time lag. In the fourth step, after a plurality of cameras are subjected to the first to third steps, the camera satisfying a predetermined specification of a shutter time lag and the camera not satisfying the specification are sorted.

It is possible to sort the cameras not satisfying the specification by performing the first to fourth steps in the camera manufacturing process. The cameras not satisfying the specification can be re-adjusted in such a manner as to satisfy the specification of the shutter time lag, or it is possible to eliminate the cameras from articles for shipment.

The function of each portion disclosed in the claims is realized by a hardware resource having a specified function in the configuration, a software resource having a function specified by a program, or the combination thereof. The realization of the function of each portion is not limited to the case in which the functions are realized in the configuration of the portions as physically individual hardware resources.

BRIEF DESCRIPTION OF DRAWINGS

FIG. 1A is a block diagram illustrating a shutter time lag measurement apparatus, and FIG. 1B is a schematic view illustrating a positional relationship between a display device and a camera.

FIG. 2A is a front view of the display device, and FIG. 2B is a cross-sectional view of the display device.

FIG. 3A is a schematic view illustrating the array of LEDs, and FIG. 3B is a schematic view illustrating an example of display of display patterns of a plurality of groups.

FIGS. 7A to 7P are schematic views illustrating an example of display patterns.

FIGS. 8A to 8P are schematic views illustrating an example of display patterns.

FIG. 9A is a timing chart illustrating a light exposure period at each position in a movement direction of a shutter, and FIG. 9B is a schematic view illustrating an example of an image captured by the camera that is a target for measurement.

FIG. 11A is a block diagram illustrating a display delay measurement apparatus, and FIG. 11B is a schematic view illustrating a positional relationship between a first camera, a second camera, a first display device, and a second display device.

FIG. 13A is a timing chart illustrating the respective switching operations of two display devices, the imaging and display of a first image by the first camera, and the imaging of a second image by the second camera, FIGS. 13B and 13C are schematic views illustrating display patterns contained in the second image, and FIGS. 13D and 13E are schematic views illustrating display patterns contained in the second image.

FIG. 14A is a block diagram illustrating a display delay measurement apparatus according to another embodiment, and FIG. 14B is a timing chart according to the other embodiment.

DESCRIPTION OF EMBODIMENT

Figure 4:
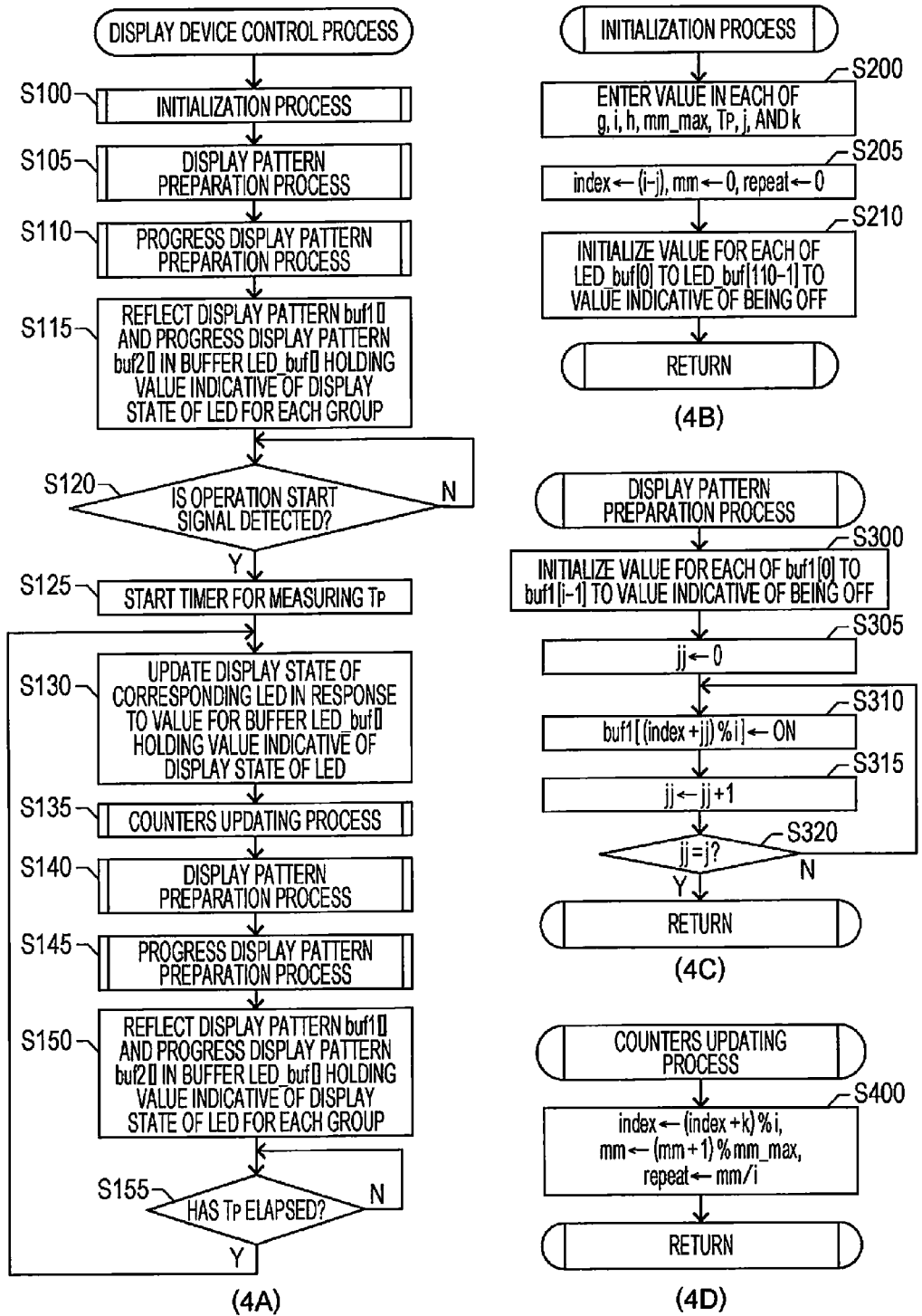
FIG. 4A is a flowchart illustrating a display device control process.
FIG. 4B is a flowchart illustrating an initialization process.
FIG. 4C is a flowchart illustrating a display pattern preparation process.
FIG. 4D is a flowchart illustrating a counters updating process.

Hereinafter, embodiments of the present invention will be described with reference to the accompanying drawings. The same reference signs are assigned to the corresponding configuration elements in the drawings, and the repeated description thereof will be omitted.

1. First Embodiment

1-1. Configuration of Shutter Time Lag Measurement Apparatus

FIG. 1A is a block diagram illustrating the configuration of a shutter time lag measurement apparatus A1 for measuring the shutter time lag of a digital still camera (hereinafter, simply referred to as a camera) 400 that is a target for measurement. The shutter time lag measurement apparatus A1 includes a synchronization control unit 300 and a display device (a display device for measuring a shutter time lag). The synchronization control unit 300 synchronizes a shutter operation of the camera 400 with a switching operation (to be described later) of a display device 200. For example, the synchronization control unit 300 includes an operation unit; a control unit; and a button pressing unit (none of these units are illustrated).

When the control unit of the synchronization control unit 300 detects an operation of the operation unit, the control unit outputs an operation starting signal to the display device 200, and controls the button pressing unit to press down a release button of the camera 400. The button pressing unit is predisposed at a position (for example, a location above the release button) in which the button pressing unit can press down the release button of the camera 400 in response to an instruction from the control unit. The button pressing unit is configured in such a manner as to stably press down the release button in a very short time in response to an instruction from the control unit. For this reason, it is possible to highly accurately synchronize the switching operation (to be described) of the display device 200 with the shutter operation of the camera 400 compared to when an operator (a human) operates the shutter of the camera 400 while the shutter operation is synchronized with the switching operation of the display device 200. When there is a time lag between the time from the operation of the operation unit of the synchronization control unit 300 to the start of the switching operation of the display device 200 and the time from the operation of the operation unit of the synchronization control unit 300 to the shutter operation for the camera 400, this time lag is taken into consideration in the acquiring of a shutter time lag (to be described later) (this time lag is added to or deducted from the value of the shutter time lag deduced from an image). The control unit of the synchronization control unit 300 may be pre-configured in such a manner that there is no deviation between a timing for outputting an operation starting signal to the display device 200 and a timing for the button pressing unit to press down the release button, based on this time lag, and thereby a start timing for the switching operation (to be described later) of the display device 200 may be synchronized with a timing for the shutter operation of the camera 400.

The display device 200 includes a control unit 220; a display unit 210; and a setting reception unit 230. The display device 200 starts the switching operation (to be described) in response to an operation start signal output from the synchronization control unit 300. FIG. 1B is a schematic view illustrating a positional relationship between the camera 400 and the display unit 210 of the display device 200. The camera 400 is disposed in such a manner that an imaging range contains an imaged surface 214a of the display unit 210 of the display device 200 while being substantially aligned with the imaged surface 214a. The camera 400 is pre-adjusted in such a manner that the imaged surface 214a is focused.

FIG. 2A is a front view of the display device 200, and FIG. 2B is a simple cross-sectional view of the display device 200 taken along line 2B-2B. The position of the display device 200 is fixed relative to the camera 400. The display unit 210 includes a plurality of LEDs 211 as display elements; a support substrate 212 for supporting the LEDs 211; a cover portion 213 supported by the support substrate 212; and a light shield portion 214 supported by the cover portion 213. The light shield portion 214 is a sheet-like member, and has the imaged surface 214a. For illustrative purposes, x, y, and z axes orthogonal to each other are defined as illustrated in FIG. 2. That is, the x axis is defined as an axis parallel to a long side of the imaged surface 214a having a rectangular shape, the y axis is defined as an axis parallel to a short side of the imaged surface 214a, and the z axis is defined as an axis orthogonal to the imaged surface 214a. The LEDs 211 are arranged on one surface of the support substrate 212.

FIG. 3A is a schematic view illustrating the array of the LEDs 211. In FIG. 3A, a number written in a circle is an identification number for identifying the LED 211. A total of 110 LEDs (LED 0 to LED 109) are arranged on the support substrate 212. The LEDs 0 to 99 are arranged in ten LEDs in a direction parallel to the x axis by ten LEDs in a direction parallel to the y axis. In the identification numbers respectively assigned to the LEDs 0 to 99, the identification number increases one by one rightward from the identification number of the leftmost LED in the direction parallel to the x axis, and the identification number increases ten by ten downward from the identification number of the uppermost LED in the direction parallel to the y axis. The LED 100 is disposed on an extension line of the LEDs 0 to 9. The LEDs 101 to 109 are respectively sequentially disposed on extension lines of the LEDs 10 to 19, the LEDs 20 to 29, the LEDs 30 to 39, the LEDs 40 to 49, the LEDs 50 to 59, the LEDs 60 to 69, the LEDs 70 to 79, the LEDs 80 to 89, and the LEDs 90 to 99. The LEDs 100 to 109 are disposed on a straight line parallel to the y axis. In the identification numbers respectively assigned to the LEDs 100 to 109, the identification number increases one by one downward from the identification number of the uppermost LED.

The cover portion 213 is a plate-like member which is supported by the support substrate 212 in such a manner as to face the surface of the support substrate 212 having the LEDs 211 arrayed thereon while the LEDs 211 are interposed between the cover portion 213 and the support substrate 212. For example, the cover portion 213 is formed of a plate having a thickness of approximately 1.5 mm for maintaining strength, and light shield properties, which prevents as much light as possible from penetrating through. In the embodiment, the cover portion 213 is formed of an acrylic plate. Holes H1 are formed in the cover portion 213 in such a manner that the positions of the holes H1 overlap those of the LEDs 211, respectively, when seen in the direction parallel to the z axis. When the cross section (for example, approximately 1.5 mm) of a portion (a portion having the hole H1 formed therein) of the cover portion 213 reflects light from the LED 211, the cross section can be seen as if a reflective surface (the cross section of the portion (the portion having the hole H1 formed therein) of the cover portion 213) other than the LED 211 emits light as an LED (in this case, the number of turned-on LEDs may be miscounted). The light shield portion 214 is provided so as to prevent an occurrence of this phenomenon. The light shield portion 214 is attached to a back surface opposite to a surface (a surface facing the support substrate 212) of the cover portion 213 in such a manner as not to deviate with respect to the cover portion 213. Holes H2 are formed in the light shield portion 214 in such a manner that the positions of the holes H2 respectively overlap those of the LEDs 211, when seen in the direction parallel to the z axis. The circumference of the hole H2 of the light shield portion 214 is positioned inside the circumference of the hole H1 of the cover portion 213 (the diameter of the hole H2<the diameter of the hole H1). The light shield portion 214 is a sheet, the thickness of which is much thinner than that of the cover portion 213. The diameter of the hole H2 is set to a size in which the hole H2 can shield reflected light of the LED 211 reflected by the cross section of the portion (the portion having the hole H1 formed therein) of the cover portion 213, and allows direct light of the LED 211 to pass therethrough. The light shield portion 214 is formed of an 18% grey reflective sheet (the imaged surface 214a is an 18% grey surface).

The control unit 220 is attached to the support substrate 212. The control unit 220 includes a CPU; a RAM; a ROM; a timer; and the like. The control unit 220 loads a program stored in the ROM into the RAM, and makes the CPU execute the program. The control unit 220 may be formed of an FPGA on which the CPU is not mounted and a built-circuit having a simple sequencer function is provided. The synchronization control unit 300 is connected to the control unit 220. When receiving an operation start signal input from the synchronization control unit 300, the control unit 220 operates the timer, and switches a display state of the LED 211 between a turn-on state (a first display state) and a turn-off state (a second display state) at every predetermined time interval. Each of the 110 LEDs 220 is connected to the control unit 220, and the control unit 220 can individually control a display state of each of the 110 LEDs 211. The support substrate 212 is provided with the setting reception unit 230. The setting reception unit 230 is configured such that an operator inputs various set items (parameters such as a pattern continuation time to be described later) regarding an operation of the display unit, and for example, is formed of a DIP switch. The setting reception unit 230 is connected to the control unit 220, and an operator can change various set items regarding an operation of the display unit prior to the measurement of the shutter time lag.

As illustrated in FIG. 1B, the camera 400 captures images of the imaged surface 214a of the display unit 210. The camera 400 is a digital still camera that can perform pre-processes required to capture images of a photographic subject, capture the images of the photographic subject via an imaging element 410, and record image data in a memory card connected to the camera 400, when the release button is pressed down. In this document, the shutter time lag is referred to as the time period taken from the pressing down of the release button to the start of light exposure. The definition of the shutter time lag is not limited to the above-mentioned time period. For example, an end time of a time period corresponding to the shutter time lag may be defined as any time during a light exposure period, and for example, the shutter time lag may be defined as the time period up to a time during the light exposure period, or may be defined as the time period up to the end of the light exposure period. An AF processing or the like may be performed between the pressing down of the release button and the light exposure, and in this case, the shutter time lag implies a shutter time lag inclusive of the time for the AF processing. For example, when the camera 400 is operated in an MF mode, it is possible to measure a shutter time lag non-inclusive of the time for the AF processing.

In the embodiment, the camera 400 includes a focal-plane shutter. Due to suction of a permanent magnet (not illustrated), a light shield curtain 420 is locked outside a light path of imaging light against a spring force of a spring (not illustrated) that pulls the light shield curtain 420 toward a position for completely shielding the imaging light. In the embodiment, in the camera 400, an electromagnet (not illustrated) pulls the light shield curtain 420 downward, and the spring pulls the light shield curtain 420 upward. When the release button is pressed down, the imaging element 410 starts being exposed to light, and when the time period corresponding to the light exposure period has elapsed from the start of the light exposure, a current is supplied to the electromagnet that generates a magnetic force to cancel out a magnetic force of the permanent magnet suctioning the light shield curtain 420, and the suction-holding of the light shield curtain 420 by the permanent magnet is released. Accordingly, due to the spring force, the light shield curtain 420 moves to the position for completely shielding the imaging light. That is, in the embodiment, an electronic shutter acts as a front curtain, and the light shield curtain (a mechanical curtain) acts as a rear curtain. The motion of the light shied curtain 420 can be approximate to a uniformly accelerated motion due to the spring force. The motion of the electronic shutter as the front curtain is also controlled to be approximate to the uniformly accelerated motion of the light shield curtain 420 at a position in a movement direction of the light shield curtain 420 so that the light exposure time can be maintained a substantially constant.

The shutters of the camera 400 as the front curtain and the rear curtain may be formed of mechanical shutters. In this case, prior to the shutter operation, a mechanical locking lever locks the front curtain against a spring force of a spring pulling the front curtain outward of the light path of the imaging light, and the front curtain is locked at the position for completely shielding the imaging light. Specifically, for example, in the camera, the mechanical lever pulls the front curtain downward, and the spring pulls the front curtain upward. Prior to the shutter operation, a mechanical locking lever locks the rear curtain outside the light path of the imaging light against a spring force of a spring pulling the rear curtain toward the position for completely shielding the imaging light. Specifically, for example, in the camera, the mechanical lever pulls the rear curtain downward, and the spring pulls the rear curtain upward. When the release button is pressed down, a current flows through each of the electromagnets, and each of the primary and rear curtains is held against the force of the spring, and in this state, the mechanical locking lever for fixing each of the primary and rear curtains is released by a solenoid actuator, and each of the primary and rear curtains is held by only a force of the electromagnet. Subsequently, the supply of a current to the electromagnet for a front curtain is shut off, the suction-holding of the front curtain is released, and the front curtain moves outward of the light path of the imaging light by the spring force. Specifically, for example, the front curtain moves above the light path in the camera, which is positioned outside the light path of the imaging light. As a result, the imaging light reaches the imaging element. Subsequently, similar to the front curtain, after a predetermined time based on a shutter speed has elapsed, the supply of a current to the electromagnet for a rear curtain is shut off, the suction-holding of the rear curtain is released, and the front curtain moves toward the position for completely shielding the imaging light by the spring force. Specifically, for example, the rear curtain moves from the bottom to the top in the camera, which is positioned outside the light path of the imaging light, and completely shields the imaging light. As a result, the imaging element is shielded from the imaging light again. The light exposure time is equivalent to the time period from when a rear end of the front curtain passes through the light path to when a tip end of the rear curtain passes through the light path. Since each of the front and rear curtains is operated by the spring force, the motion of each of the front and rear curtains can be approximate to a uniformly accelerated motion.

As illustrated in FIG. 1B, in the embodiment, the camera 400 is installed in such a manner that the movement direction of the light shield curtain 420 is parallel to the y axis. The shutter of the camera 400 moves from a negative y direction to a positive y direction. The angle of view of the camera 400 is adjusted in such a manner that the height (the length in the y axis direction) of the imaged surface 214a of the display unit 210 corresponds to the height of an image captured by the camera 400. The movement direction of the light shield curtain 420 in a y-z plane may not be exactly parallel to the y axis. For example, when the movement direction of the light shield curtain 420 is projected on a plane parallel to an x-y plane, the projected movement direction is preferably parallel to the y axis in the plane.

1-2. Operation of Display Device

The control unit 220 of the display device 200 can display various different display patterns on the display unit 210 by bringing a display state of each of the LEDs of the display unit 210 into a turn-on state or a turn-off state. A display pattern displayed on the display unit 210 is designed to be switched whenever a predetermined time preset via the setting reception unit 230 has elapsed. This predetermined time is referred to as the pattern continuation time. First type display elements are the LEDs that form a display pattern switched at every pattern continuation time. The number of LEDs assigned to the first type display elements and the mode of a display pattern defines the maximum number of different types of display patterns that can be displayed by the LEDs. There are LEDs (the LEDs of the display unit 210) present so as to illustrate the number of times of display of the maximum number of types of the display patterns whenever each of the maximum number of types of the display patterns is displayed, and the LEDs are LEDs other than the LEDs assigned to the first type display elements. The LEDs for illustrating the number of times is referred to as second type display elements. The display unit 210 displays a progress display pattern to illustrate the number of times by bringing a display state of each of the LEDs assigned to the second type display elements into a turn-on state or a turn-off state.

The LEDs of the display unit 210 are divided into one or more groups (the number of groups is preset via the setting reception unit 230). Each of the groups contains the LEDs assigned to the first type display element and the LEDs assigned to the second type display element. The LEDs are divided into two or more groups, and the groups line up in the direction parallel to the y axis. One group is formed by the LEDs, the positions of which are close to each other in the direction parallel to the y axis. For example, in the embodiment, when the number of groups is three, the LEDs are grouped as illustrated in FIG. 3A. That is, an upper group 120 is formed by a total of 33 LEDs (the LEDs 0 to 29 and the LEDs 100 to 102), a middle group 130 is formed by a total of 33 LEDs (the LEDs 30 to 59 and the LEDs 103 to 105), and a lower group 140 is formed by a total of 33 LEDs (the LEDs 60 to 89 and the LEDs 106 to 108). In the upper group 120, an LED group 120a of the LEDs 0 to 19 is assigned to the first type display elements of the upper group 120. In addition, in the upper group 120, an LED group 120c of the LEDs 100 to 102 and an LED group 120b of the LEDs 20 to 29 are assigned to the second type display elements. Similar to the upper group, the LEDs in the middle group 130 are also divided into LED groups assigned to the first type display elements, and an LED group assigned to the second type display elements. Specifically, an LED group 130a is assigned to the first type display elements, and LED groups 130c and 130b are assigned to the second type display elements. Similar to the upper group 120 and the middle group 130, in the lower group 140, an LED group 140a is assigned to the first type display elements, and LED groups 140c and 140b are assigned to the second type display elements.

As such, the mode (the number of LEDs of a group, the assignment of each LED to the first type display element or the second type display element, or the like) of the LED grouping is pre-determined in response to the number of groups. In the embodiment, when the number of groups is one, the LEDs 0 to 99 are assigned to the first type display elements, and the LEDs 100 to 109 are assigned to the second type display elements. For example, when the number of groups is five, the LEDs are divided into five groups, each of which is formed by two lines of 22 LEDs on two adjacent lines parallel to the x axis. For example, specifically, one of the groups is formed by the LEDs 0 to 19 and the LEDs 100 and 101. At this time, in the one group, the LEDs 0 to 19 are assigned to the first type display elements, and the LEDs 100 and 101 are assigned to the second type display elements. Similarly, the LEDs are assigned to the first type display elements and the second type display element in other groups. For example, when the number of groups is 10, each group is formed by 11 LEDs on one line parallel to the x axis. For example, specifically, one of the groups is formed by the LEDs 0 to 9 and the LED 100. At this time, in the one group, the LEDs 0 to 9 are assigned to the first type display elements, and the LED 100 is assigned to the second type display element. Similarly, the LEDs are assigned to the first type display elements and the second type display element in other groups. In the embodiment, when the number of groups is three, the LED groups 120*b*, 130*b*, and 140*b* are used as the second type display elements, and in contrast, when the number of groups is one, five, or ten, the LED groups 120*b*, 130*b*, and 140*b* are used as the first type display elements.

In the embodiment, in this manner, it is possible to change the use of the LED in response to the number of groups.

During the same time period, each group does not necessarily display the same pattern as other groups via a display device control process (to be described later); however, when the same pattern is displayed, it is easy to deduce a shutter time lag for each group from the captured images. That is, during the same time period, all of the groups display the same display pattern expressed by an LED group assigned to the first type display elements, and display the same progress display pattern expressed by an LED group assigned to the second type display elements. FIG. 3B illustrates a display state of each of the LEDs 0 to 109 during a time period when the number of groups is 3. In FIG. 3B, a turned-on LED is illustrated by a black circle, and a turned-off LED is illustrated by a white circle. As illustrated in FIG. 3B, all of the groups display the same pattern during the same time period.

FIG. 4A is a flowchart illustrating the display device control process executed by the display device 200. The control unit 220 performs an initialization process (step S100), prepares a display pattern in a display pattern buffer (an array buf1 [ ]) by performing a display pattern preparation process (step S105), and prepares a progress display pattern in a progress display pattern buffer (an array buf2 [ ]) by performing a progress display pattern preparation process (step S110). Subsequently, for each group, the control unit 220 reflects the values of the display pattern buffer (the array buf1 [ ]) and the values of the progress display pattern buffer (the array buf2 [ ]) in an LED buffer (an array LED_buf [ ]) that holds the values indicative of display states of 110 LEDs (step S115). At this time, the reflection of the values in the LED buffer implies that the values of the array buf1 [ ] are copied in the range of the LED_buf [ ] corresponding to the array buf1 [ ], and the values of the array buf2 [ ] are copied in the range of the LED_buf [ ] corresponding to the array buf2 [ ]. The correspondence is changed in response to the number of groups. The correspondence will be described later.

Subsequently, the control unit 220 determines whether an operation start signal from the synchronization control unit 300 is detected (step S120), and when the operation start signal is not detected, the control unit 220 waits until the operation start signal is detected. When the control unit 220 determines that an operation start signal is detected, the control unit 220 starts the counting of a timer for measuring a pattern continuation time $T_P$ (step S125). Subsequently, the control unit 220 updates the display states of the corresponding LEDs in response to the values of the LED buffer (the array LED_buf [ ]) (step S130). That is, the array LED_buf [ ] is in an one-to-one correspondence with 110 LEDs, the control unit 220 turns on the LEDs corresponding to the locations, each of which stores a value indicative of an ON state in the array LED_buf [ ], and turns off the LEDs corresponding to the locations, each of which stores a value indicative of an OFF state in the array LED_buf [ ]. A display pattern displayed on the display unit 210 is switched by the execution of step S130.

Subsequently, the control unit 220 performs a counters updating process (step S135). Subsequently, the control unit 220 prepares a display pattern in the display pattern buffer (the array buf1 [ ]) by performing the display pattern preparation process (step S140), and prepares a progress display pattern in the progress display pattern buffer (the array buf2 [ ]) by performing the progress display pattern preparation process (step S145). Subsequently, similar to step S115, for each group, the control unit 220 reflects the values of the display pattern buffer (the array buf1 [ ]) and the values of the progress display pattern buffer (the array buf2 [ ]) in the LED buffer (the array LED_buf [ ]) (step S150). Subsequently, the control unit 220 determines whether the pattern continuation time $T_P$ has elapsed (step S155). When the pattern continuation time $T_P$ has not elapsed, the control unit 220 waits until the pattern continuation time $T_P$ has elapsed, and when the elapse of the pattern continuation time $T_P$ is determined, the process returns to step S130. The control unit 220 repeats steps S130 to S155, thereby executing an operation of switching a display pattern displayed on the display unit 210 at every pattern continuation time $T_P$. The display device control process has been described up to this point.

FIG. 4B is a flowchart illustrating the initialization process. First, the control unit 220 sets the value of each of parameters g, i, h, mm_max, $T_P$, j, and k (step S200). The parameter g holds a value for the number of groups when the LEDs are grouped. The parameter i holds a value for the number of LEDs that act as the first type display elements in each group. The parameter h holds a value for the number of LEDs that act as the second type display elements in each group. The parameter $T_P$ holds a value for the pattern continuation time. The parameter mm_max holds a value for the maximum number of the patterns pre-determined in response to the value of each of the parameters i and h, and expressed by the first type display elements and the second type display elements. The parameter j holds a value for the number of LEDs in an ON state for each display pattern. The parameter k holds a value for the number of LEDs, the display states of which are changed from a turn-on state to a turn-off state (the number of LEDs, the display states of which are changed from a turn-off state to a turn-on state) when a display pattern is switched.

Figure 5:
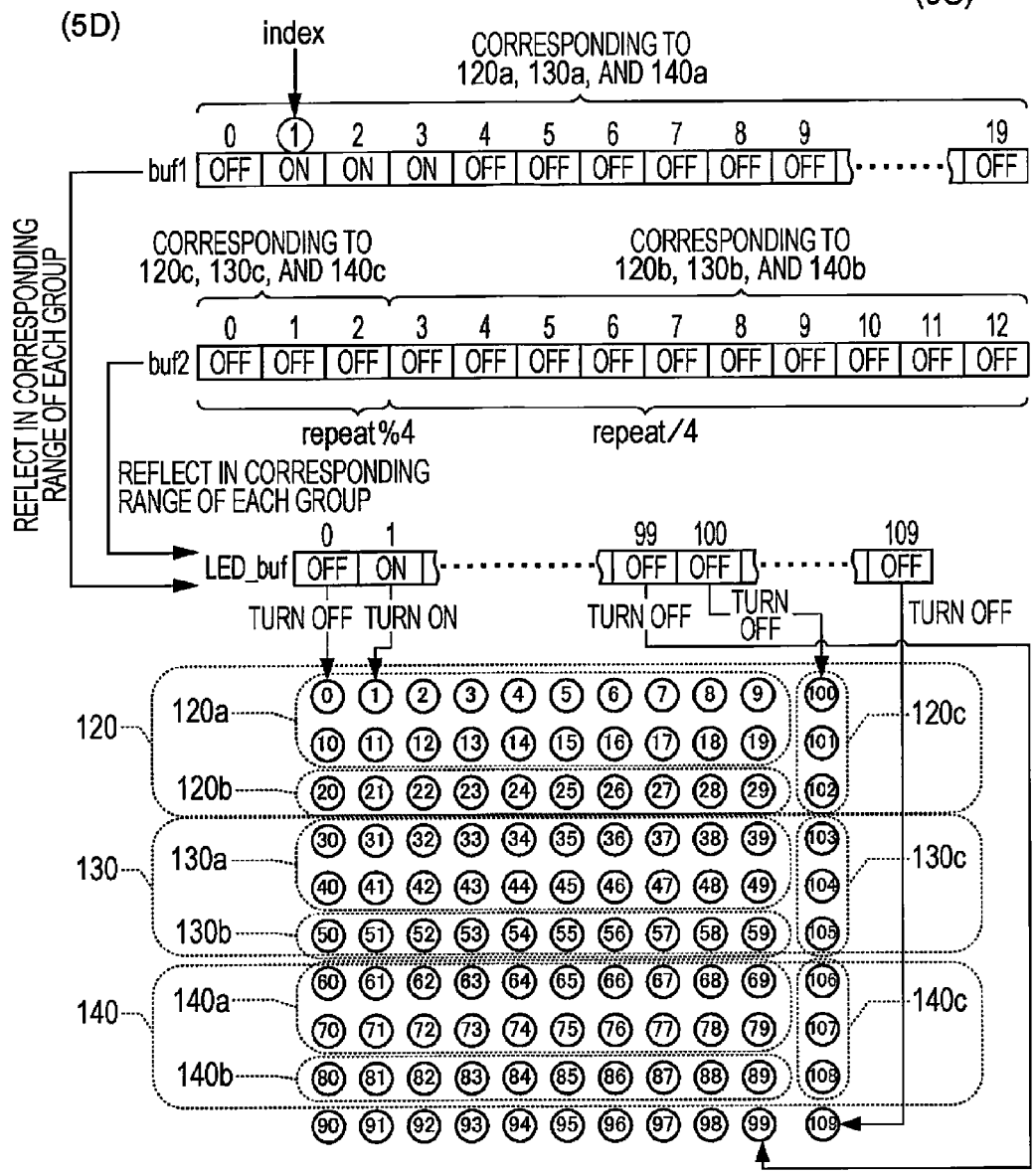
FIGS. 5A, 5B, and 5C illustrate an example of setting of an operation of a display unit.
FIG. 5D is a schematic view illustrating process content of the display device control process.

FIGS. 5A, 5B, and 5C illustrate an example of a correspondence between the value of each DIP switch and the value of each of the parameters g, h, mm_max, $T_P$, and j when the DIP switches are adopted as the setting reception unit 230. In the embodiment, in step S200, the value of each of the parameters g, i, h, mm_max, $T_P$, and j is set in response to the set content of the setting reception unit 230. In the embodiment, when the number (g) of groups is determined, the value of each of the parameters i, h, and mm_max is uniquely determined. In the embodiment, the value of the parameter k is fixed to one. In another embodiment, the value of the parameter k may be changeable in response to the set content of the setting reception unit 230.

Subsequently, the control unit 220 sets an initial value for each of parameters "index", "mm", and "repeat" (step S205). j is the number of turned-on LEDs in a display pattern expressed by i (i is a natural number) LEDs assigned to the first type display elements, and in the embodiment, j LEDs having successive identification numbers are controlled to be turned on. Among i LEDs, the LED having the maximum identification number is treated to be successive to the LED having the minimum identification number. Accordingly, when the values indicative of the display states of i LEDs are stored in a display pattern buffer of array buf1 [0] to buf1 [i−1], the array buf1 [0] to buf1 [i−1] is treated as a ring buffer. The respective identification numbers of turned-on LEDs are shifted by a count of k in an increasing direction of the identification number. In the array buf1 [ ] as a ring buffer, the parameter index holds a value indicative of the rearmost turned-on LED in a transition direction of the pattern among j (j is a natural number) turned-on LEDs having successive identification numbers. The parameter "index" can have a value in the range of 0≤index≤(i−1). The initial value of the parameter "index" may be set to any integer in the range of 0 or greater and (i−1) or less; however, in the embodiment, the initial value of the parameter index is set to (i−j).

The parameter mm holds a value indicative of a pattern that is currently displayed among mm_max (mm_max is a natural number) different patterns expressed by i LEDs (the first type display elements) and h LEDs (the second type display elements). The parameter "mm" can have a value in the range of 0≤mm≤(mm_max−1). The initial value of the parameter "mm" is set to 0. The parameter repeat holds the number of times when a display pattern is repeatedly displayed by the maximum number (in the embodiment, the maximum number is i) of the different display patterns that can be expressed by i LEDs (the first type display elements) The initial value of the parameter "repeat" is set to 0. The parameter "repeat" can have a value in the range of 0≤ repeat≤{(mm_max−1/i)}. The parameters "mm", "repeat", and "index" are updated in the counters updating process illustrated in step S135. That is, the parameters "mm", "repeat", and "index" are updated whenever the pattern continuation time $T_P$ has elapsed.

Subsequently, the control unit 220 initializes each of 110 values of an array LED_buf [0] to LED_buf [109] to a value indicative of a turn-off state (step S210). The array LED_ buf [ ] is a buffer that holds values respectively indicative of the display states of 110 LEDs illustrated in FIG. 3A. The suffix of an array corresponds to the identification number of an LED. In step S210, the entirety of the array is initialized to the value indicative of an OFF state; however, the values stored in the array LED_buf [0] to LED_buf [109] are either one of the value indicative of a turn-on state and the value indicative of a turn-off state. The initialization process has been described up to this point.

FIG. 4C is a flowchart illustrating the display pattern preparation process. The display pattern preparation process is a process in which the control unit 220 prepares display patterns expressed by i LEDs (the first type display elements), and stores the display patterns in the array buf1 [0] to buf1 [i−1]. The values stored in the array buf1 [0] to buf1 [i−1] are either one of the value indicative of a turn-on state and the value indicative of a turn-off state. Initially, the control unit 220 initializes each value of the array buf1 [0] to buf1 [i−1] to the value indicative of an OFF state (step S300). The array buf1 [0] to buf1 [i−1] corresponds to the LEDs (the first type display elements) of each group. For example, in the embodiment, since i is equal to 20, when the number of groups is three (g=3), as illustrated in FIG. 5D, buf1 [0] to buf1 [19] correspond to each of the LED groups 120a, 130a, and 140a.

When the number of groups is one (in the embodiment, i=100), buf1 [0] to buf1 [99] correspond to the LEDs 0 to 99 in the sequence, respectively. When the number of groups is five (in the embodiment, i=20), the buf1 [0] to buf1 [19] correspond to the LEDs 0 to 19, the LEDs 20 to 39, the LEDs 40 to 59, the LEDs 60 to 79, and the LEDs 80 to 99. When the number of groups is ten (in the embodiment, i=10), buf1 [0] to buf1 [9] respectively correspond to the LEDs 0 to 9, the LEDs 10 to 19, the LEDs 20 to 29, the LEDs 30 to 39, the LEDs 40 to 49, the LEDs 50 to 59, the LEDs 60 to 69, the LEDs 70 to 79, the LEDs 80 to 89, and the LEDs 90 to 99.

Subsequently, the control unit 220 prepares a display pattern in the array buf1 [0] to buf1 [i−1] (a ring buffer), in which the respective identification numbers of j LEDs are successive from that of the LED indicated by the parameter "index". For this reason, first, the control unit 220 enters 0 in a parameter jj (step S305). The parameter jj has a value in the range of 0≤jj≤j. Subsequently, the control unit 220 enters the value indicative of an ON state in an array buf1 [(index+jj) % i] (step S310), and increments the value of the parameter jj (step S315). "%" is an operator indicative of the remainder, and [(index+jj) % i] is the remainder obtained by dividing (index+jj) by i. Since the array buf1 [0] to buf1 [i−1] are treated as a ring buffer, the control unit 220 enters the value indicative of an ON state in a position in the array buf1 [ ], the position being indicated by the remainder that is obtained by dividing (index+jj) by i. That is, since the parameter "index" has a value in the range of 0≤index≤(i−1), control is performed in such a manner that the value of (index+jj) does not exceed the maximum value and returns to the minimum value (the value of (index+jj) does not exceed an end entry of the array buf1 [ ] and returns to a leading entry of the array buf1 [ ]). Subsequently, the control unit 220 determines whether the value of the parameter jj is equal to the value of the parameter j (step S320). When the value of the parameter jj is not equal to the value of the parameter j, the process returns to step S310, and steps S310 to S315 are repeated until jj is equal to j. When the value of the parameter jj is not equal to the value of the parameter j, the control unit 220 ends the display pattern preparation process.

Figure 6:
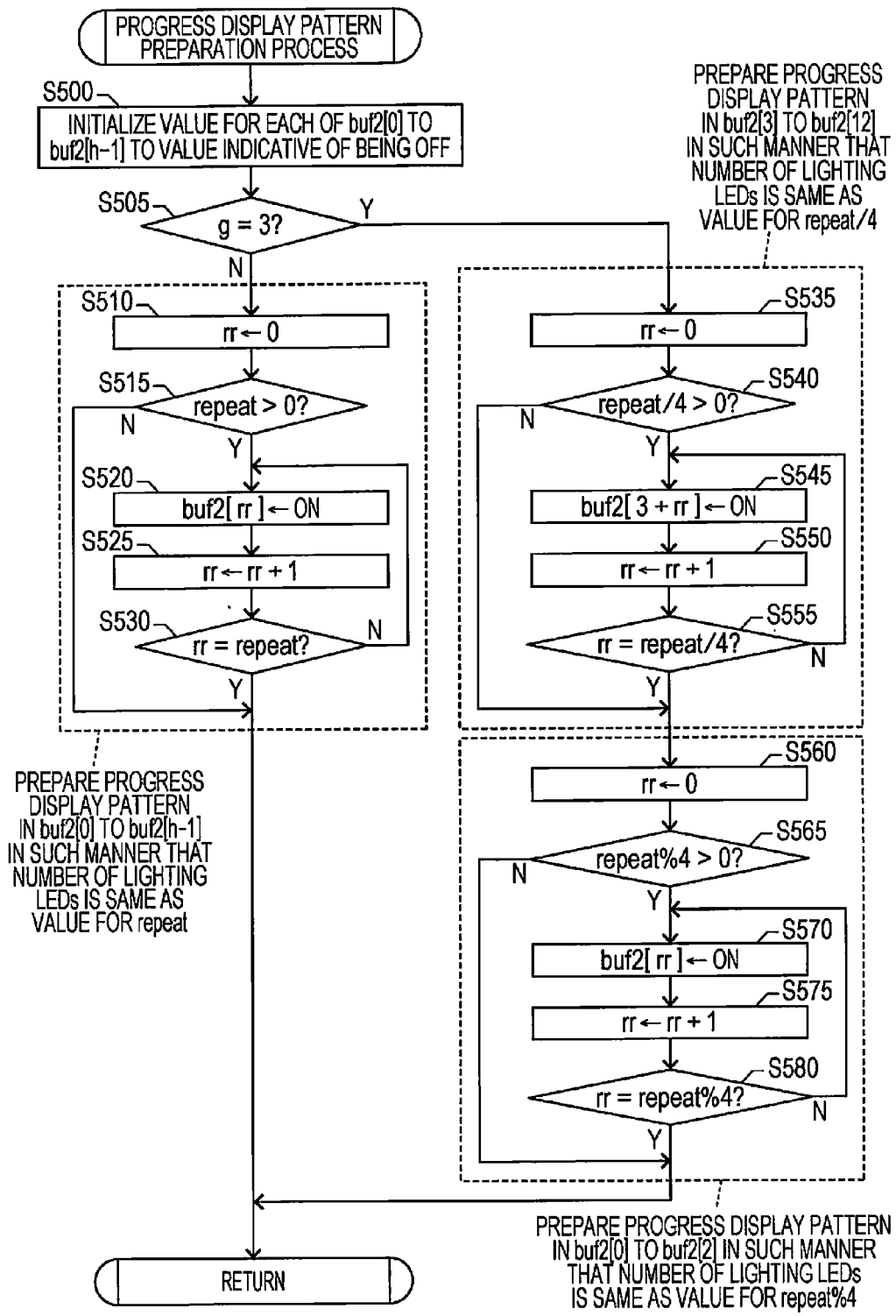
FIG. 6 is a flowchart illustrating a progress display pattern preparation process.

FIG. 6 is a flowchart illustrating the progress display pattern preparation process. The progress display pattern preparation process is a process in which the control unit 220 prepares display patterns expressed by h LEDs (the second type display elements), and stores the display patterns in an array buf2 [0] to buf2 [h−1]. The values stored in the array buf2 [0] to buf2 [h−1] are either one of the value indicative of a turn-on state and the value indicative of a turn-off state. The progress display pattern illustrates the number of times (the value being held by the parameter "repeat") when the display of i types of the display patterns (the display patterns being expressed by i LEDs that are the first type display elements) is completed. The progress display pattern may be prepared in any mode insofar as the progress display pattern can illustrate the number of times, and in the embodiment, the progress display pattern is prepared as follows.

Initially, the control unit 220 initializes each value of the array buf2 [0] to buf2 [h−1] to the value indicative of an OFF state (step S500). The array buf2 [0] to buf2 [h−1] corresponds to the LEDs (the second type display elements) of each group. The correspondence is changed in response to the number of groups, and for example, when the number of groups is three (in the embodiment, h=13), as illustrated in FIG. 5D, the array buf2 [0] to buf2 [2] corresponds to each of the LED groups 120c, 130c, and 140c. Array buf2 [3] to buf2 [12] corresponds to each of the LED groups 120b, 130b, and 140b. When the number of groups is one (in the embodiment, h=10), buf2 [0] to buf2 [9] correspond to the LEDs 100 to 109 in the sequence, respectively. When the number of groups is five (in the embodiment, h=2), buf2 [0] and buf2 [1] respectively correspond to the LEDs 100 and 101, the LEDs 102 and 103, the LEDs 104 and 105, the LEDs 106 and 107, and the LEDs 108 and 109. When the number of groups is ten (in the embodiment, h=1), buf2 [0] corresponds to one of the LEDs 100 to 109.

Subsequently, the control unit 220 determines whether the number of groups is three (g=3) (step S505), and when the number of groups is not three, the control unit 220 executes steps S510 to S530, and when the number of groups is three, the control unit 220 executes steps S535 to S580. First, when the number of groups is a number other than three, that is, in the embodiment, when the number of groups is one, five, or ten, the progress display pattern is prepared in such a manner that the number of turned-on LEDs is the same as the number of times (the value of the parameter "repeat") when a set of i (i is a natural number) display patterns are displayed. For this reason, first, the control unit 220 initializes the value of a parameter rr to 0 (step S510). In steps S510 to S530, the parameter rr can have a value in the range of 0≤rr≤repeat. Subsequently, the control unit 220 determines whether the value of the parameter "repeat" is greater than 0 (step S515). When the value of the parameter "repeat" is equal to 0, the control unit 220 ends the progress display pattern process (since the number of turned-on LEDs is 0). When the control unit 220 determines that the value of the parameter "repeat" is greater than 0 in step S515, the control unit 220 enters the value indicative of an ON state in buf2 [rr] (step S520), increments the value of the parameter rr (step S525), and determines whether the value of the parameter rr is equal to the value of the parameter "repeat" (step S530). When it is determined that the value of the parameter rr is not equal to the value of the parameter "repeat" in step S530, the process returns to step S520, and steps S520 to S525 are repeated until it is determined that the value of the parameter rr is equal to the value of the parameter "repeat", and when it is determined that the value of the parameter rr is equal to the value of the parameter "repeat", the control unit 220 ends the progress display pattern preparation process.

When the number of groups is three, as illustrated in FIG. 5D, the number of times when a set of the display patterns are displayed is expressed at two stages by the LEDs corresponding to buf2 [0] to buf2 [2] and the LEDs corresponding to buf2 [3] to buf2 [12]. Specifically, a one-digit number is expressed by the number of turned-on LEDs among the three LEDs corresponding to the buf2 [0] to buf2 [2], and a four-digit carry-over number is obtained. The carry-over number is expressed by the number of turned-on LEDs among ten LEDs corresponding to buf2 [3] to buf2 [12]. More specifically, as illustrated in FIG. 5D, when C indicates the number of turned-on LEDs among the ten LEDs corresponding to buf2 [3] to buf2 [12], and D indicates the number of turned-on LEDs among the three LEDs corresponding to buf2 [0] to buf2 [2], the progress display pattern is prepared in such a manner that C×4+D is equal to the value of the parameter "repeat". In other words, C is equivalent to a quotient (repeat/4) obtained by dividing the parameter "repeat" by 4, and D is equivalent to the remainder (repeat % 4) obtained by dividing the parameter "repeat" by 4. In the progress display pattern expressed by 13 LEDs, a portion equivalent to C is prepared in steps S535 to S555, and a portion equivalent to D is prepared in steps S560 to S580.

In the process of preparing the portion equivalent to C, the control unit 220 initializes the value of the parameter rr to 0 (step S535). In steps S535 to S555, the parameter rr can have a value in the range of 0≤rr≤(repeat/4). Subsequently, the control unit 220 determines whether a quotient obtained by dividing the parameter "repeat" by 4 is greater than 0 (step S540), and when the quotient is less than or equal to 0, the process proceeds to step S560 (since the number of turned-on LEDs in a region for the carry-over number is 0, the preparation of the portion equivalent to C is ended, the process proceeds to step S560, and the preparation of the portion equivalent to D is performed). When the quotient obtained by dividing the parameter "repeat" by 4 is greater than 0, the control unit 220 enters the value indicative of an ON state in an array buf2 [3+rr] (step S545), increments the value of the parameter rr (step S550), and determines whether the value of the parameter rr is equal to the quotient obtained by dividing the parameter "repeat" by 4 (step S555). When the value of the parameter rr is equal to the quotient, the process proceeds to step S560, and when the value of the parameter rr is not equal to the quotient, steps S545 to S550 are repeated until the value of the parameter rr is equal to the quotient.

Subsequently, in the process of preparing the portion equivalent to D, first, the control unit 220 initializes the value of the parameter rr to 0 (step S560). In steps S560 to S580, the parameter rr can have a value in the range of 0≤rr≤(repeat % 4). Subsequently, the control unit 220 determines whether the remainder obtained by the parameter "repeat" by 4 is greater than 0 (step S565), and when the remainder is equal to 0, the control unit 220 ends the progress display pattern preparation process (since the number of turned-on LEDs is equal to 0). When the remainder is greater than 0, the control unit 220 enters the value indicative of an ON state in the buf2 [rr] (step S570), increments the value of the parameter rr (step S575), and determines whether the value of the parameter rr is equal to the remainder obtained by the parameter "repeat" by 4 (step S580). When the value of the parameter rr is equal to the remainder obtained by the parameter "repeat" by 4, the progress display pattern preparation process is ended, and when the value of the parameter rr is not equal to the remainder obtained by the parameter "repeat" by 4, steps S570 to S575 are repeated until the value of the parameter rr is equal to the remainder obtained by the parameter "repeat" by 4. The progress display pattern preparation process has been described up to this point.

As described above, in the display pattern preparation process, the display pattern is prepared in the array buf1 [0] to buf1 [i−1], and in the progress display pattern preparation process, the progress display pattern is prepared in the array buf2 [0] to buf2 [h−1]. Thereafter, in step S115 or S150, as illustrated in FIG. 5D, the values of the array buf1 [0] to buf

[i−1] and the values of the array buf2 [0] to buf2 [h−1] are respectively copied in the corresponding ranges of the array LED_buf [0] to LED_buf [109]. The corresponding range of the array LED_buf [0] to LED_buf [109] with respect to the array buf1 [0] to buf1 [i−1] or the array buf2 [0] to buf2 [h−1] is changed in response to the number of groups. The correspondence is as described above. FIG. 5D illustrates an example in which the number of groups is 3. After the values of the array buf1 [0] to buf1 [i−1] and the values of the array buf2 [0] to buf2 [h−1] are respectively copied in the corresponding ranges of the array LED_buf [0] to LED_buf [109], in step S130, the display state of each of the corresponding LED is updated in response to each value in the array LED_buf [ ].

FIG. 4D is a flowchart illustrating the counters updating process. This process is executed whenever the time $T_P$ has elapsed. The control unit 220 updates the value of each of the parameters "index", "mm", and "repeat" (step S400). Specifically, the control unit 220 enters the remainder obtained by dividing (index+k) by the value of the parameter i in the parameter "index". That is, the value of the parameter "index" is updated in such a manner that the position of each of turned-on LEDs (the first type display elements) is shifted by a count of k in a subsequent display pattern. Since the parameter "index" has a value in the range of 0≤index≤(i−1), when the value of (index+k) exceeds the maximum value of the parameter "index", the remainder obtained by dividing (index+k) by the parameter i is entered in the parameter "index" in such a manner that the value of (index+k) returns to the minimum value. The remainder obtained by dividing (mm+1) by the value of the parameter mm_max is entered in the parameter "mm". Since the parameter "mm" has a value in the range of 0≤mm≤(mm_max−1), when the value of (mm+1) exceeds the maximum value of the parameter "mm", the remainder obtained by dividing (mm+1) by the value of the parameter mm_max is entered in the parameter "mm" in such a manner that the value of (mm+1) returns to the minimum value. The quotient obtained by dividing the value of the parameter mm by the value of the parameter i is entered in the parameter "repeat". In a case where the i different types of the display patterns illustrated by i LEDs are defined as one set, since the parameter "repeat" holds a value for the number of times when the one set of the display patterns are repeatedly displayed, the quotient obtained by dividing the parameter "mm" by the parameter i is entered in the parameter "repeat". The counters updating process has been described up to this point.

FIGS. 7 and 8 illustrate views illustrating the transition of a pattern when g=3, i=20, j=3, k=1, h=13, and $T_P$=0.5 ms. Since the middle group 130 and the lower group 140 have the same display content as that of the upper group 120 during the same time period, only the upper group 120 is illustrated. In FIGS. 7 and 8, a turned-on LED is illustrated by a black circle, and a turned-off LED is illustrated by a white circle. The control unit 220 changes 20 different types of display patterns illustrated by 20 LEDs 0 to 19 (the first type display elements) every 0.5 ms. An operation of switching from an arbitrary m-th display pattern to an (m+1)-th display pattern among 20 types of display patterns is performed as follows (m is a natural number and 1≤m≤I, and when m is 20, (m+1) becomes 1). In a case where in the m-th display pattern, three (j=3) display elements among 20 display elements are in a turn-on state, and 17 display elements other than the three turned-on display elements are in a turn-off state, the display state of the display element is switched in such a manner that in the (m+1)-th display pattern, one (k=1) of the three display elements turned on in the m-th display pattern is brought into a turn-off state, and one of 17 display elements turned off in the m-th display pattern is brought into a turn-on state. At this time, m indicates the sequence of the i different types of the display patterns expressed by i LEDs (the first type display elements), and has a value in the range of 1≤m≤i. m is equivalent to a value (1+mm % i) that is obtained by adding one to the remainder obtained by the value of the parameter "mm" by i.

When the m-th display pattern is switched to the (m+1)-th display pattern, k LEDs having a long turn-on time are selected in a descending order among the turned-on LEDs in the m-th display pattern, and switch from a turn-on state to a turn-off state. In k=1, when attention is paid to an arbitrary LED assigned to the first type display element, the LED is continuously turned on across j display patterns that are displayed successively in time. That is, the turn-on time of the LED can be expressed by $T_P j/k$. In the example illustrated in FIGS. 7 and 8, $T_P j/k$ is 1.5 ms. For this reason, compared to when the turn-on time of an arbitrary LED is $T_P$, it is possible to continuously turn on an LED for a long time, and it is possible to brightly imprint a turned-on display element in a captured image of the display unit 210.

In the example illustrated in FIGS. 7 and 8, it is possible to display 880 (880=(mm_max=20)×4×11) different types of display patterns while changing the display pattern from the display pattern (a pattern expressed by a display pattern and a progress display pattern) illustrated in FIG. 7A to the pattern illustrated in FIG. 8P every 0.5 ms. Since TP is 0.5, it is possible to express 440 ms by a unit of 0.5 ms. In the display device control process, control is performed in such a manner that the display of an initial pattern is repeated when the pattern continuation time $T_P$ has elapsed after patterns (the number of patterns corresponding to the value of the parameter mm_max) are displayed.

1-3. Procedure of Measuring Shutter Time Lag

When an operator operates the synchronization control unit 300, the release button of the camera 400 is pressed down, and an operation of switching a display pattern of the display device 200 starts. When the release button is pressed down, during the execution of the switching operation, the camera 400 captures still images of the imaged surface 214a of the display device 200, and records the captured images in a recording medium. The operator deduces a shutter time lag based on the recorded images in the recording medium. The description above is regarding a general flow of the measurement of the shutter time lag.

FIG. 9A is a timing chart illustrating a light exposure period $T_E$ of the imaging element 410 in three regions divided in response to the motion of the shutter of the camera 400 and a position in the movement direction of the shutter. As described above, in the shutter of the camera 400, the motion of each of a front curtain S1 and a rear curtain S2 is approximate to a quadratic curve. When the region of imaging element 410 is divided into three regions (an upper region, a middle region, a lower region) in a direction parallel to the movement direction of the shutter, and the shutter time lags of the regions refer to $\Delta T_U$, $\Delta T_M$, and $\Delta T_L$, respectively, as illustrated in FIG. 9A, in the embodiment, the relationship between the three shutter time lags is to $\Delta T_U < \Delta T_M < \Delta T_L$. When the number of groups is set to three in the display device 200, it is possible to measure the respective shutter time lags of the three regions of the imaging element 410. When an imaging range is adjusted in such a manner that the upper region, the middle region, and the lower region of the imaging element 410 contain the upper group 120, the middle group 130, and the lower group 140 illustrated in FIG. 3A, respectively, it is possible to measure the respective shutter time lag for the regions.

FIG. 9B illustrates an example of an image captured by the camera 400 in a state where conditions are set in this manner. The following description will be given on the assumption that the shutter speed of the camera 400 capturing this image is preset to 1 ms. In addition, in the display device 200, the parameters g, i, j, k, and $T_P$ are preset as follows: g=1, i=20, j=3, k=1, and $T_P$=0.5 ms. In the example illustrated in FIG. 9B, in the upper group 120, a captured image contains a total of six luminous regions: a region 10a equivalent to an upper end portion in the hole H2 corresponding to the LED 10 (a lower side of the upper end portion is seen to be turned off); regions 11a, 12a, 13a, and 14a respectively equivalent to the entire insides of the holes H2 corresponding to the LEDs 11 to 14; and a region 15a equivalent to a lower end portion in the hole H2 corresponding to the LED 15 (an upper side of the lower end portion is seen to be turned off). The regions 12a and 13a imprinted in the captured image are the brightest among the six regions, and the regions 11a and 14a are the brightest following the regions 12a and 13a. The regions 10a and 15a imprinted in the captured image are the darkest among the six regions. In the middle group 130, a captured image contains a total of six luminous regions: a region 42a equivalent to an upper end portion in the hole H2 corresponding to the LED 42 (a lower side of the upper end portion is seen to be turned off); regions 43a, 44a, 45a, and 46a respectively equivalent to the entire insides of the holes H2 corresponding to the LEDs 43 to 46; and a region 47a equivalent to a lower end portion in the hole H2 corresponding to the LED 47 (an upper side of the lower end portion is seen to be turned off). The regions 44a and 45a imprinted in the captured image are the brightest among the six regions, and the regions 43a and 46a are the brightest following the regions 44a and 45a. The regions 42a and 47a imprinted in the captured image is the darkest among the six regions. In the lower group 140, a captured image contains a total of six luminous regions: a region 73a equivalent to an upper end portion in the hole H2 corresponding to the LED 73 (a lower side of the upper end portion is seen to be turned off); regions 74a, 75a, 76a, and 77a respectively equivalent to the entire insides of the holes H2 corresponding to the LEDs 74 to 77; and a region 78a equivalent to a lower end portion in the hole H2 corresponding to the LED 78 (an upper side of the lower end portion is seen to be turned off). The regions 75a and 76a imprinted in the captured image are the brightest among the six regions, and the regions 74a and 77a are the brightest following the regions 75a and 76a. The regions 73a and 78a imprinted in the captured image are the darkest among the six regions. In the captured image of the example illustrated in FIG. 9B, in any one of the groups, the LEDs corresponding to the second type display elements are not luminous. Accordingly, it is possible to roughly estimate that the imaging element 410 is exposed to light while the display patterns illustrated in FIG. 7N to the display pattern illustrated in FIG. 8D are displayed.

Figure 10:
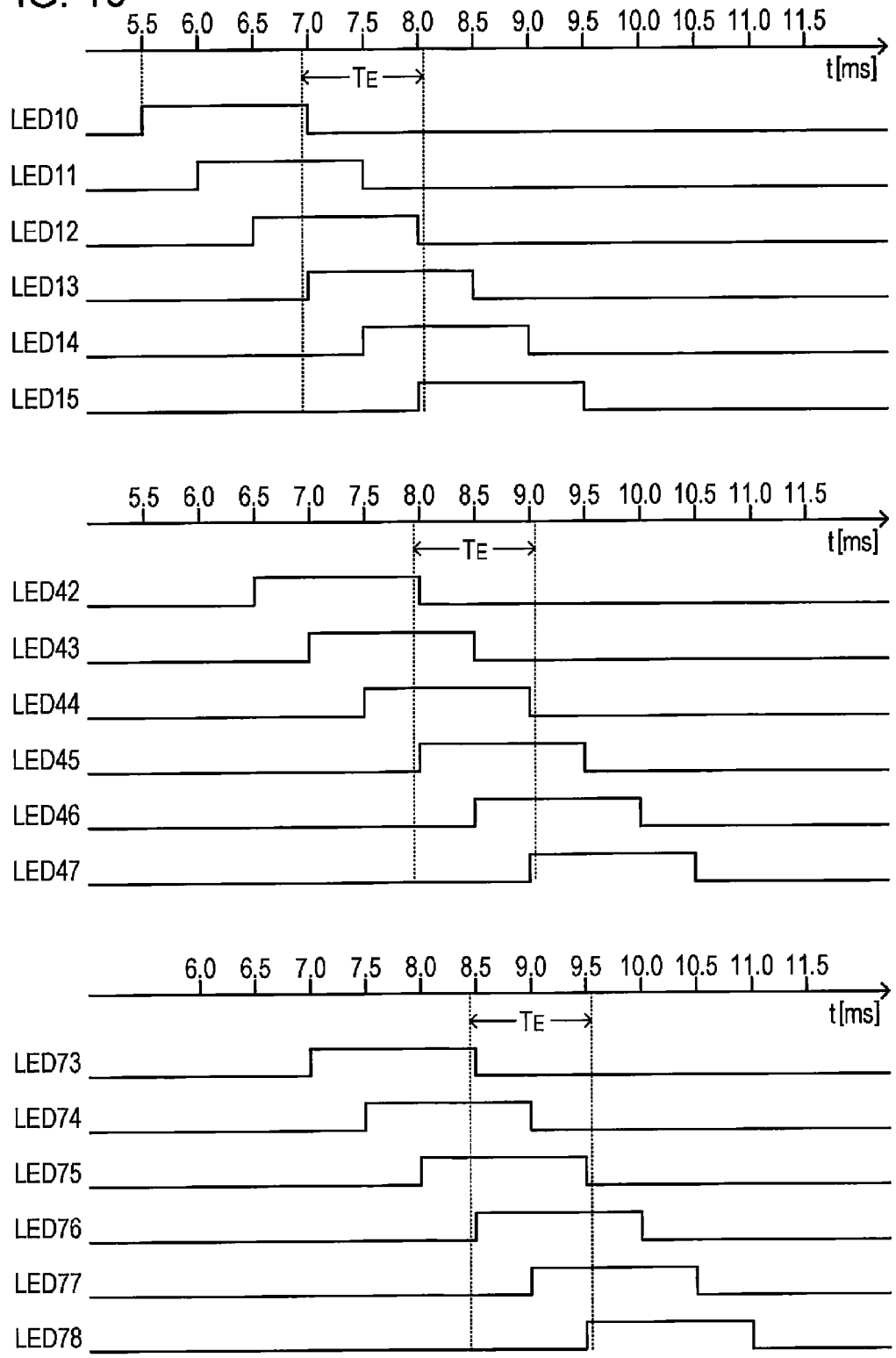
FIG. 10 shows timing charts illustrating the light exposure period and LED turn-on periods.

FIG. 10 is a timing chart illustrating the respective turn-on period (the period of H) of the LEDs 10 to 15, the LEDs 42 to 47, and the LEDs 73 to 78. The turn-on time of each LED is 1.5 ms. In FIG. 9B, it is understood that since the respective entire inner regions 11a, 12a, 13a, and 14a of the holes H2 are luminous in the LEDs 11 to 14, the respective turn-on times of the LEDs 11 to 14 are contained in a time period (that is, a light exposure period) from when the front curtain passes through the positions of pixels (pixels capturing the LEDs 11 to 14) of the imaging element (the light exposure starts when the front curtain passes through the corresponding positions on the imaging element) to when the rear curtain passes through the positions. It is understood that since the regions 12a and 13a are brighter than the regions 11a and 14a, the LEDs 12 and 13 are turned on for a longer time than the LEDs 11 and 14 during the light exposure period. It is understood that since only the upper end portion (the region 10a) in the hole H2 corresponding to the LED 10 is luminous in the captured image, the LED 10 is turned off immediately after the front curtain passes through a position (a position corresponding to the upper end portion (an end portion in the −y direction)) of a pixel (the pixel capturing the image of the LED 10) of the imaging element (before the front curtain passes through a position of the pixel, the position corresponding to a lower end portion of the LED 10). It is understood that since only the lower end portion (the region 15a) in the hole H2 corresponding to the LED 15 is luminous in the captured image, the LED 15 is turned off before the rear curtain passes through a position (a position corresponding to the lower end portion (an end portion in the +y direction)) of a pixel (the pixel capturing the image of the LED 15) of the imaging element, and starts to be turned on immediately before the rear curtain passes through the position (the position corresponding to the lower end portion) of the pixel.

Even when the light exposure period $T_E$ of the camera 400 is set to 1 ms, actually, the light exposure period $T_E$ may be greater than or less than 1 ms due to variations. In the embodiment, the light exposure period $T_E$ of the camera 400 is set to 1 ms, but actually, the light exposure period $T_E$ is slighter greater than 1 ms. From these factors, it is understood that the pixels capturing an image of the region of the LEDs 10 to 15 of the upper group 120 in the x-axis direction start to be exposed to light after approximately 7 ms has elapsed from the shutter operation as illustrated in FIG. 10. Accordingly, it is possible to deduce that the shutter time lag $\Delta T_U$ in the upper region is approximately 7 ms. In the similar manner, from the image illustrated in FIG. 9B, it is possible to deduce that the shutter time lag $\Delta T_M$ in the middle region is approximately 8 ms, and the shutter time lag $\Delta T_L$ in the lower region is approximately 8.5 ms.

In the digital camera with a focal-plane shutter, since the front curtain and the rear curtain of the shutter pass through a front region of the imaging element in sequence, a difference in shutter time lag occurs depending on positions on the imaging element in the movement direction of the shutter. In the embodiment, it is possible to deduce shutter time lags for a plurality of positions in the direction parallel to the movement direction of the shutter from one image obtained via one-time image capturing. Since a shutter time lag is long compared to the operation time of the shutter curtain, the following two objects are unlikely to be achieved via one-time image capturing: in response to a position in the movement direction of the shutter curtain, measuring the movement mode of the shutter curtain at a high resolution, and measuring a shutter time lag. However, it is possible to achieve the two objects via one-time image capturing by properly adjusting the mode (the number of first type display elements or the number of second type display elements in one group) of LED grouping. Typically, a shutter operation is not stable, and with regard to one shutter operation, it is important to be able to measure the travelling characteristics of the shutter in response to the position of the shutter in the movement direction thereof.

Typically, since the operation time of the shutter curtain is approximately 2 ms to approximately 4 ms, the pattern continuation time $T_P$ is selected in response to the characteristics of the curtain and a shutter speed. The shutter speed of approximately 1/1000 s is preferably measured from an approximate operation time of the shutter curtain. It may be able to set a pattern continuation time of 0.2 ms, 0.75 ms, or the like by increasing the number of DIP switches of the setting reception unit 230.

The display device 200 includes the LEDs assigned to the second type display elements in each of a plurality of the groups. The LEDs assigned to the second type display elements are disposed close to the LEDs assigned to the first type display elements of a group (a group to which the LEDs assigned to the second type display elements) in the movement direction of the shutter. For this reason, it is possible to clearly deduce a shutter time lag for a position on the imaging element, the position corresponding to each of the groups. When each of the groups does not contain the LEDs assigned to the second type display elements, and all of the groups share the LEDs assigned to the second type display elements, the following problem occurs.

For example, it is assumed that the LEDs 0 to 89 are divided into nine groups of first to ninth groups (one group is formed by every ten of the LEDs 0 to 89, the ten LEDs being positioned on a straight line parallel to the x axis, and the ten LEDs of each of the groups act as the first type display elements), and all of the groups share the LEDs 90 to 99 acting as the second type display elements (the LEDs 100 to 109 are not used). The display state of each of the LEDs assigned to the second type display elements is changed whenever one set of display patterns (10 types of display patterns) is displayed by the LEDs assigned to the first type display elements. When the time ($10 \times T_P$) required to display one set of display patterns using the LEDs assigned to the first type display elements is shorter than a differential time from the light exposure start time of a region of the imaging element corresponding to the first group to the light exposure start time of a region of the imaging element corresponding to the ninth group, the display pattern of each of the groups does not necessarily correspond to progress (the number of times when the display of one set of display patterns is completed) expressed by the second type display elements. For this reason, it is not possible to clearly specify the shutter time lag for each of the groups from the captured image.

For example, more specifically, in the first group, light exposure is performed before one set of the display patterns is completely displayed, and in the ninth group, light exposure is performed after one set of the display patterns is completely displayed. Since the LEDs 90 to 99 (the second type display elements) are positioned so as to be involved in light exposure later than the ninth group, the second type display elements are involved in light exposure while displaying that one set of the display patterns of the groups is completely displayed. From the image captured in this manner, it is not possible to clearly specify whether the display pattern of the first group belongs to a second set of the display patterns or a first set of the display patterns. In contrast, even in this case, when one group is formed by the LEDs close to each other in the movement direction of the shutter, and each of the groups includes the second type display elements as in the embodiment, it is possible to clearly deduce a shutter time lag for the position corresponding to each of the groups from the image.

In the embodiment, when the number of groups is three, as illustrated in FIG. 3A, the LEDs 20 to 29 (the second type display elements) are disposed closer to the −y direction than the LEDs assigned to the first type display elements of the same group. In addition, the LEDs 100 to 103 (the second type display elements) are displayed in such a manner that the number of LEDs turned on in the −y direction increases as the time has elapsed. This scheme is made on the assumption that the shutter moves from the +y direction to the −y direction, and is implemented so that a non-contradictory display can be performed over time.

In the example according to the embodiment, the number of groups is three. When the motion of the shutter of the camera (a target for measurement) is approximate to a uniformly accelerated motion, it is possible to define a quadratic curve indicative of the motion of the shutter by measuring a shutter time lag for at least three positions. It is possible to estimate a shutter time lag for other non-measured positions based on the quadratic curve. For this reason, when a shutter time lag is desired to be measured for a position in the movement direction of the shutter, the number of groups is preferably at least three. When the number of groups is three or more, the angle of view is preferably adjusted in such a manner that the image of one of the three or more groups is captured by pixels of a center portion of the imaging element in the direction parallel to the movement direction of the shutter, and since other groups are respectively disposed on upper and lower sides in such a manner as to be vertically symmetrical with the center portion interposed therebetween, the number of groups is preferably an odd number. In the embodiment, it is possible to change the number (g) of groups via the setting reception unit 230. For this reason, it is possible to change the resolution of measurement of a shutter time lag in the movement direction of the shutter of the camera (a target for measurement).

When the resolution is desired to be increased, a plurality (for example, two) of the display devices may be prepared and used for capturing an image. The plurality of display devices are disposed in such a manner as to overlap in the direction parallel to the y axis, and the respective positions of the camera and the display devices are adjusted in such a manner that the plurality of display devices are simultaneously contained in the imaging range of the camera. When the number of groups is set to three in one display device; however, when two display devices are used, it is possible to obtain a total of six groups, and it is possible to measure a shutter time lag for six regions by operating the display devices in synchronization.

It is possible to change the parameters i, j, and $T_P$ via the setting reception unit 230 (it may also be able to change the parameter k). It is possible to increase and decrease the number of types of a display pattern by increasing and decreasing i. It is possible to increase and decrease the turn-on time ($jT_P/k$) by increasing and decreasing j, k, and $T_P$. Accordingly, when the set values of these parameters are changed, in response to various conditions such as imaging conditions (a shutter speed or the like) of the camera (a target for measurement), it is possible to adjust the turn-on time or the number of types of a display pattern in such a manner that the display pattern is imprinted in an image in a state where the display pattern is easily identified. It is possible to uniquely specify a shutter time lag from a captured image by setting the value of the parameter i or h in such a manner that the same pattern is not displayed during the period from a shutter operation to light exposure.

Since the luminance of an LED may be excessively high or low in image capturing, it may be possible to switch the luminance of the LED in multiple stages via the setting reception unit 230.

It is possible to further increase the resolution of measurement of a shutter time lag to the extent that the pattern continuation time $T_P$ is decreased; however, since the time to continuously turn on an arbitrary LED is further decreased to the extent that the pattern continuation time $T_P$ is decreased, the image of an LED turned on during the light exposure period of the camera is captured as being dark. As a result, the LED turned on during the light exposure period of the camera is unlikely to be identified. When the value of the parameter j or k is changed in such a manner that the value of (j/k) is increased to the extent that the value of $T_P$ is set to be small, it is possible to increase the time to continuously turn on an arbitrary LED. As a result, the image of an LED turned on during the light exposure period of the camera is captured as being bright, and it is possible to easily identify the LED. When it is necessary to easily identify the LED, the value of ($T_P$j/k) is set in such a manner as to be the predetermined shortest time T or greater (the shortest time in response to imaging conditions of the camera or imaging environment) required to imprint the image (image having predetermined brightness) of the LED in the captured image, and thereby it is possible to easily identify the LED turned on during the light exposure period of the camera.

In the example according to the embodiment, the number of groups is three; however, the number of groups is not necessarily three. For example, when in the number of groups is one, and the parameters are set as follows: i=20, j=3, and k=1, it is possible to obtain the same switching operation illustrated in FIGS. 7A to 7P and FIGS. 8A to 8D. In addition, for example, when the parameters are set as follows: i=100, j=3, and k=1, it is possible to define 100 different display patterns. At this time, when the LEDs 101 to 109 are not used as the second type display elements, it is possible to measure the time having the maximum length of 100×$T_P$ at every the pattern continuation time $T_P$.

1-4. Configuration of EVF Display Delay Measurement Apparatus

FIG. 11A is a block diagram illustrating the configuration of a display delay measurement apparatus A2 for measuring a display delay time from the capturing of an image to the display of the image when a digital still camera (hereinafter, referred to as a first camera, and a target for measurement) 800 displays the captured image in a live view mode on a display unit. The display delay measurement apparatus A2 includes a synchronization control unit 500; a first display device 600; a second display device 700; and a second camera 900. Since each of the first display device 600 and the second display device 700 is the same apparatus as the display device 200, the same reference signs will be assigned to the same configuration elements as those of the display device 200, and the description thereof will be omitted. The synchronization control unit 500 synchronizes a switching operation of the first display device 600 with a switching operation of the second display device 700. For this reason, for example, the synchronization control unit 500 includes an operation unit and a control unit (none of these units are illustrated). When the control unit of the synchronization control unit 500 detects an operation of the operation unit, the control unit outputs an operation start signal to each of the first display device 600 and the second display device 700. Since the first display device 600 and the second display device 700 receives the operation start signal, and can start a switching operation, the first display device 600 and the second display device 700 can display the same display pattern at the same time.

FIG. 11B is a schematic view illustrating a positional relationship between the first camera 800, the second camera 900, the imaged surface 214a of the first display device 600, and the imaged surface 214a of the second display device 700. The first camera 800 includes an electronic view finder (EVE) 830 as a display unit. The EVF 830 includes a liquid crystal screen 830a and an eye lens group 830b, and it is possible to adjust the visibility with respect to the liquid crystal screen 830a by moving the eye lens group 830b in a direction parallel to an optical axis. The EVF 830 has a function of displaying captured images of a photographic subject in a moving picture, and typically, this function is referred to as a live view display function. The first camera 800 can display an image captured at a first frame rate on the liquid crystal screen 830a in a live view mode at a second frame rate. The first camera 800 is disposed in such a manner that an imaging range contains the imaged surface 214a of the first display device 600. The second camera 900 is disposed in such a manner that an imaging range contains both of the EVF 830 of the first camera 800 and the imaged surface 214a of the second display device 700. The second camera 900 is a digital still camera having a function of capturing a still image or a moving picture of a subject. The second camera 900 includes a control unit (not illustrated); a control unit (not illustrated); a display unit (not illustrated); an imaging element 910; a lens group 930; and the like, and the control unit controls each of the units such that the function of capturing a still image or a moving picture is realized. The lens group 930 forms an image of a photographic subject on the imaging element 910. The second camera 900 can store a captured image in a recording medium 910 connected to the second camera 900. When the first camera 800 includes a back surface liquid crystal screen instead of the EVF, a live view may be displayed on the back surface liquid crystal screen. In this case, the second camera 900 captures an image of the back surface liquid crystal screen.

A measurement technique is used, for example, the lens group 930 of the second camera 900 is operated or disposed in such a manner that the second camera 900 captures an image displayed on the liquid crystal screen 830a of the EVF 830 and the imaged surface 214a of the first display device 600 at the same time; however, typically, since the EVF is disposed on a back surface of a camera, and has a narrow angle of view, in many cases, it is not an easy task to dispose the second camera 900 in such a manner that the imaging range of the second camera 900 contains an image displayed on the liquid crystal screen 830a of the EVF 830 and the imaged surface 214a of the first display device 600 at the same time. For this reason, it is practical to have the second display device 700 disposed in the vicinity of the second camera 900 and operated in the exactly same manner at the exactly same time as the display unit 210 of the first display device 600, and to capture the respective images of the liquid crystal screen 830a of the EVF 830 and the imaged surface 214a of the second display device 700 via the second camera 900. At this time, the size of the display unit 200 of the first display device 600 is not necessarily the same as that of the display unit 200 of the second display device 700. For example, the display unit 200 of the second display device 700 may have a similar shape but have a small size compared to those of the display unit 200 of the first display device 600 so that both control units can be easily compared to each other in an image captured by the second camera 900.

An image displayed on the liquid crystal screen 830a of the EVF 830 can be observed via the eye lens group 830b, and typically, the eye point of the eye lens group 830b is separated by a short distance therefrom, and is separated by approximately a few centimeters from a lens surface in many cases. For this reason, the lens group 930 of the second camera 900 is required to have a macro mode and to be able to perform close-up imaging so that an image can be focused on the imaging element 910 via the lens group 930 of the second camera 900. In addition, it is necessary to be able to perform a wide angle of imaging via the lens group 930 of the second camera 900 so that an image of the imaged surface 214a of the second display device 700 can be captured at the same time along with an image of the liquid crystal screen 830a of the EVF 830. It is necessary to be able to capture an image displayed on the liquid crystal screen 830a and an image of the imaged surface 214a of the second display device 700 in a state where both of the image displayed on the liquid crystal screen 830a and the imaged surface 214a are focused, and the second camera is required to have a wide range of depth of field. Typically, a wide range of depth of field is realized by decreasing the focal length of a lens and closing a diaphragm of the lens. However, since it is difficult to extremely increase the range of depth of field, it is necessary to dispose the imaged surface 214a of the second display device 700 as much close to the EVF 830. For this reason, as illustrated in FIG. 11B, when the imaged surface 214a of the second display device 700 is disposed such that the value of a distance d1 is closer to the value of a distance d2 than a distance d3, the installation is done so that the EVF 830 and the imaged surface 214a of the second display device 700 can be focused.

When an image displayed on the liquid crystal screen 830a of the EVF 830 is formed on the imaging element 910 while being focused on the imaging element 910 via the eye lens group 830b and the lens group 930 of the second camera 900, there is a high possibility that the range of depth of field of the second camera 900 is positioned farther than the distance d2. For this reason, when the second display device 700 is disposed distant from the second camera 900 in the range of depth of field in order for the distance d1 is greater than the distance d2, the second camera 900 easily focus on both of the imaged surface 214a of the second display device 700 and the EVF 830.

1-5. Procedure of Measurement of EVF Display Delay

Figure 12:
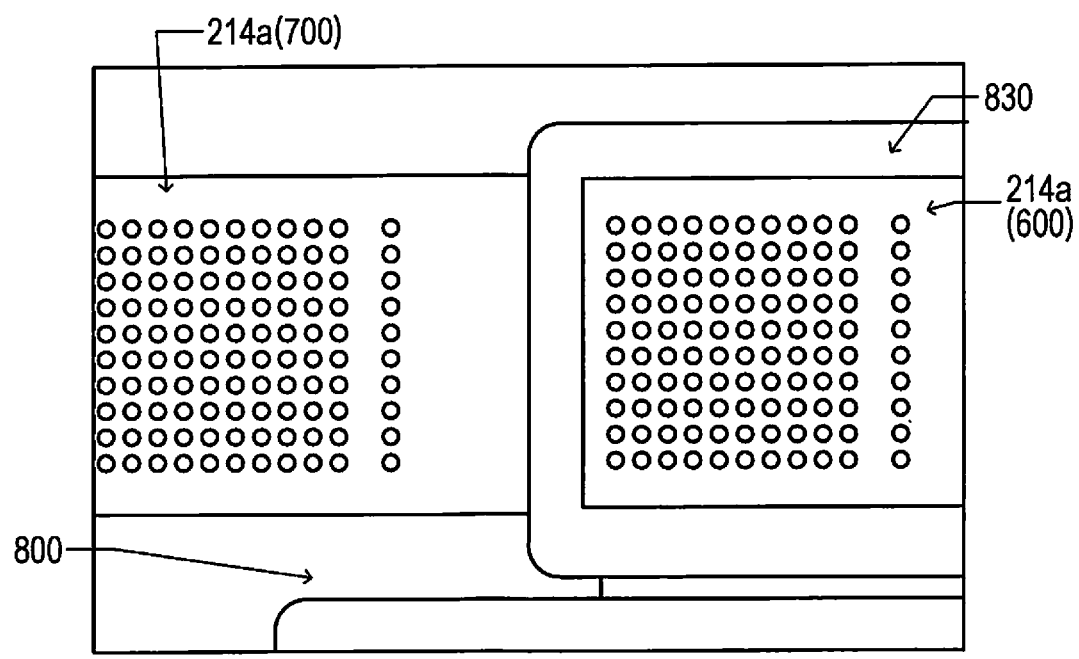
FIG. 12 is a view illustrating a second image.

When an operator operates the synchronization control unit 500, the first display device 600 and the second display device 700 start the respective switching operations at the same time. The same content is preset via each of the setting reception unit 230 of the first display device 600 and the setting reception unit 230 of the second display device 700. For this reason, the respective display units 210 of the first display device 600 and the second display device 700 switch a display pattern in the same manner at the same time. The first camera 800 is set in such a manner that a live view is displayed on the EVF 830, and the first camera 800 captures a first image containing the imaged surface 214a of the first display device 600, and displays the first image in a live view mode on the EVF 830. When the operator presses down a release button (operation unit), the second camera 900 captures a second image containing 830 on which the first image is displayed in a live view mode and the imaged surface 214a of the second display device 700, and the second camera 900 records the captured second image in the recording medium 910. FIG. 12 illustrates an example of the second image captured by the second camera 900. The second camera 900 may captures a plurality of still images at random times as the second image, or may capture a moving picture as the second image. The operator deduces a display delay time based on the second image recorded in the recording medium 910. The description above is regarding a general flow of the measurement of a display delay.

When still images are captured at random times, and a display delay time is measured based thereon, it is necessary to capture a considerable pieces of still images so as to find the range (the minimum display delay time to the maximum display delay time) of variations in the display delay time. When an accuracy of approximately 1 ms is required as a measurement accuracy of the display delay time, still images are preferably captured at a shutter speed of approximately 1 ms ($\frac{1}{1000}$ s). In contrast, it is a simple method to capture a moving picture, and to individually analyze each image contained in the moving picture; however, since a moving picture is typically captured at a frame rate of approximately 30 fps or approximately 60 fps, a light exposure time for each line of each image contained in the moving picture is long compared to when still images are captured a shutter speed of 1 ms. When the light exposure time is long, a large number of LEDs are seen as being turned on in each image contained the captured moving picture, and there is a possibility that it is difficult to specify (deduce a time) a display pattern imprinted in an image. In addition, since a plurality of display patterns are imprinted, a changed time is deduced (there is a width equivalent to a light exposure time present) depending on which of the display patterns draws attention. Accordingly, for example, when a display pattern at the start of light exposure or the like is not determined to be a display pattern to which attention is paid so as to deduce a time, there is a possibility that large variations in the time deduced from an image occur equivalent to the light exposure time. In a case where a moving picture is captured, preferably, the second camera can capture a high-definition moving picture at a high speed of 1000 fps whenever possible. In a case where it is not possible to capture a high-definition moving picture at a high speed of approximately 1000 fps, a moving picture is captured at a speed lower than 1000 fps, and in this case, the above-mentioned problem occurs. In light of these factors, a proper selection of a frame rate or definition is required in capturing a moving picture.

It is possible to easily specify a time A (to be described later) or an imaging time B (to be described later) based on the second image by displaying the same display pattern on the two display devices during the same time period. The two display devices may have or may not have the same display pattern or the same mode of a switching operation. When the two display devices have the same display pattern or the same mode of a switching operation, the above-mentioned merits are obtained, and in contrast, even though the two display devices do not have the same display pattern or the same mode of a switching operation, when there is a clear correspondence present between a time indicated by an arbitrary display pattern displayed on the first display device 600 and a time indicated by a display pattern displayed on the second display device 700 at that time, it is possible to specify the imaging time B (to be described later) from the display pattern (the display pattern being contained in the second image) displayed on the display unit of the second display device. It is also possible to specify the time A (to be described later) from the second image. For example, the second display device 700 may be a stop watch or a watch which starts to operate at the same time when the operation of the first display device 600 starts. In addition, the first display device 600 and the second display device 700 may be stop watches or watches which operate in synchronization with each other.

FIG. 13A is a timing chart illustrating an example of the respective switching operations of the two display devices, the imaging and display of the first image by the first camera 800, and the imaging of the second image by the second camera 900. Here, with regard to the imaging and display of the first image illustrated in FIG. 13A, when a display frame has an identifier containing the same number as that contained in an identifier of an imaging frame, the display frame displays an image corresponding to the imaging frame. For example, in FIG. 13A, it is meant that an image captured during a time period of a frame S1 is displayed during a time period of a frame D1. The horizontal length of an imaging frame indicates a light exposure time.

In FIG. 13A, for example, when a second image E is captured, an image of the frame D1 is displayed in a region extending from the beginning of the first image to approximately one third the region of the first image displayed on the EVF 830 of the first camera 800. In addition, for example, when a second image F is captured, an image of the frame D6 is displayed in a region extending from the beginning of the first image to approximately two thirds the region of the first image displayed on the EVF 830 of the first camera 800, and an image of a frame D5 is displayed in the remaining approximately one third the region. A time period from the imaging of the first image to the display thereof includes a delay time containing a time required to convert imaging data to display data. As in the embodiment, when the first frame rate and the second frame rate are not synchronized with each other, variations in a display delay time occur. Typically, a display device such as EVF sequentially switches a line in one image (one frame) in a unit of line, and when the writing of the one image (one frame) is completed, the display device prepares a subsequent image, and sequentially switches a line in the subsequent image in a unit of line. For this reason, lines continue to display the same image during a period from the previous writing to the subsequent writing. For this reason, when an operator deduces a display delay time from an image, it is not possible to confirm a display delay time based on a piece of the second image. For this reason, the second camera 900 captures a plurality of still images as the second images at random times, and display delay times are deduced from the second images. It is possible to deduce the range of variations in a display delay time from the plurality of display delay times. A moving picture may be captured as the second image, and in this case, similarly, it is possible to deduce the range of variations in a display delay time from a plurality of still images of the moving picture.

Each of the first display device 600 and the second display device 700 switches a display pattern in the following conditions: g=1, j=3, and k=1. FIG. 13B is a schematic view illustrating an example of an image contained in the second image E when the imaged surface 214a of the second display device 700 is captured, and FIG. 13C is a schematic view illustrating an example of an image contained in the second image E and the first image when the imaged surface 214a of the first display device 600 is captured. FIG. 13B illustrates the imaging time B when the second camera 900 captures the second image. FIG. 13C illustrates the time A when the first camera 800 captures the first image. Specifically, the time indicates a time when an image equivalent to approximately one third the frame D1 from the beginning thereof (an image equivalent to one third frame S1 from the beginning thereof) is captured. In a case where the first image is displayed on the EVF 830 of the first camera 800 at the imaging time B when the second camera 900 captures the second image E, the first image is an image captured by the first camera 800 at the time A earlier than the imaging time B by the display delay time. In other words, the EVF 830 of the first camera 800 displays the first image at the imaging time B later by the display delay time than the time A (behind the time A by the display delay time) when the first camera 800 captures the first image. For this reason, it is possible to express the display delay time of the first camera 800 by (B−A).

The number of LEDs seen as being turned on in the image illustrated in FIG. 13B is different from the number of LEDs seen as being turned on in the image illustrated in FIG. 13C. The reason is that a light exposure time of the second camera 900 is different from that of the first camera 800. Similar to the method of deducing a shutter time lag, it is understood that the image (at the imaging time B) illustrated in FIG. 13B is an image captured by the second camera 900 via light exposure of approximately 1 ms between a time of approximately 28 ms and a time of approximately 29 ms ($28 \leq t < 29$). Similarly, it is understood that the image (at the time A) illustrated in FIG. 13C is an image captured by the first camera 800 via light exposure of approximately 14 ms between a time of approximately 4 ms and a time of approximately 18 ms ($4 \leq t < 18$). Accordingly, from the comparison of the light exposure start times, it is possible to deduce that the display delay time (B−A) of the first camera 800 is approximately 24 ms from the second image E in FIGS. 13B and 13C. When the light exposure end time of the first camera 800 is compared to the light exposure start time of the second camera 900, it is possible to deduce that the display delay time is approximately 10 ms from the second image E in FIGS. 13B and 13C. When the second camera 900 captures an image at a high shutter speed of 1/1000 s compared to when the second camera 900 captures an image at a low shutter speed, it is easy to deduce the imaging time B in that a large number of display patterns are not imprinted in the image. Since the light exposure time (1/1000 s) of the second camera 900 when capturing the second image is considerably shorter than the light exposure time of the first camera 800 when capturing the first image, or an image display update interval (an inverse number of a frame rate for display), it is possible to more accurately deduce the time A when the first image displayed on the EVF 830 at the imaging time B is captured. Since the pattern continuation time $T_P$ of each of the two display devices is 1 ms, and the light exposure time of the second camera 900 is 1 ms, it is possible to specify the time A or the imaging time B at an accuracy of approximately 1 ms.

FIG. 13D is a schematic view illustrating an example of an image contained in the second image F when the imaged surface 214a of the second display device 700 is captured, and FIG. 13E is a schematic view illustrating an example of an image contained in the second image F and the first image when the imaged surface 214a of the first display device 600 is captured. Similar to the method of deducing a shutter time lag, it is understood that the image (at the imaging time B) illustrated in FIG. 13D is an image captured by the second camera 900 via light exposure of approximately 1 ms between a time of approximately 112 ms and a time of approximately 113 ms ($112 \leq t < 113$). Similarly, it is understood that the image (at the time A) illustrated in FIG. 13E is an image captured by the first camera 800 via light exposure of approximately 14 ms between a time of approximately 70 ms and a time of approximately 84 ms (70≤t<84) (it is meant that when a region extending from an end of an image to approximately one third the image of the turned-on LEDs is captured, a region extending from an end of a frame S5 to approximately one third of the frame S5 is captured at that time). Accordingly, from the comparison of the light exposure start times, it is possible to deduce that the display delay time (B−A) of the first camera 800 is approximately 42 ms from the second image F in FIGS. 13D and 13E. When the light exposure end time of the first camera 800 is compared to the light exposure start time of the second camera 900, it is possible to deduce that the display delay time is approximately 28 ms from the second image F in FIGS. 13D and 13E. When a plurality of the second images are captured, it is possible to deduce the range of variations in the display delay time (the minimum display delay time to the maximum display delay time) based on the plurality of captured second images.

When the procedure is executed in this manner, it is possible to measure a display delay time when a live view is displayed on a display unit such as an EVF of a camera.

The two display devices of the display delay measurement apparatus A2 may be configured such that only one LED is turned at the same time, and an LED turn-on time is the pattern continuation time $T_P$; however, the two display devices are preferably configured such that it is possible to increase a turn-on state by performing control in order for the LED turn-on time to be $T_P j/k$ as in the embodiment. When the pattern continuation time $T_P$ is shorter than the light exposure time for which the first camera 800 captures the first image, a plurality of display patterns are sequentially displayed during the light exposure time. For this reason, the plurality of display patterns are also imprinted in the captured first image. In the configuration in which the LEDs are continuously turned on over the time $T_P j/k$, the LEDs turned on during the light exposure time are imprinted into an image while being bright compared to the LEDs turned on during the light exposure time in the configuration in which the LED turn-on time is $T_P$. When the turned-on LEDs are dark and are unlikely to be identified in a captured image in a state the LED turn-on time is the pattern continuation time $T_P$, control is performed in such a manner that the LED turn-on time is $T_P j/k$, and the light exposure time of the camera is set to be greater than the pattern continuation time $T_P$ (when the pattern continuation time $T_P$ is set to be long, a large number of display patterns are imprinted in an image, which makes analysis difficult, and thereby a proper adjustment is required), and thereby it is possible to easily identify the turned-on LEDs from the captured image without sacrificing a measurement accuracy, and to easily specify the display patterns imprinted in the image. As a result, it is easy to specify the time for a display pattern.

2. Another Embodiment

The technology range of the present invention is not limited to the above-mentioned embodiment, and various modifications can be made insofar as the modifications do not depart from the spirit of the present invention. For example, in the display delay measurement of the embodiment, the display delay measurement apparatus includes the second display device, the scone camera captures the second image containing the display unit of the second display device and the first image, a display delay time expressed by (B−A) is deduced from the second image, and in contrast, the display delay measurement apparatus may be configured as follows. FIG. 14A illustrates the configuration of a display delay measurement apparatus A3 according to another embodiment. The display delay measurement apparatus A3 does not include the second display device. The synchronization control unit 510 of the display delay measurement apparatus A3 includes an operation unit; a control unit; and a button pressing unit (none of these units are illustrated), and when the synchronization control unit 510 detects an operation of the operation unit, the synchronization control unit 510 outputs an operation start signal to the first display device 600, and the first display device 600 can start a switching operation. The button pressing unit can press down the release button of the second camera 900 in response to an instruction from the control unit. While the first display device 600 executes the switching operation, the control unit of the synchronization control unit 510 can control the release button of the second camera 900 to be pressed down and to capture the second image containing the first image displayed on the EVF 830 of the first camera 800.

When still images are captured as the second images, the synchronization control unit 510 presses down the release button of the second camera 900 multiple times. The synchronization control unit 510 records times for pressing the release button in a recording medium of the synchronization control unit 510. Since the synchronization control unit 510 can recognize a start time for the switching operation of the first display device 600, it is possible to record a time BB for pressing the release button with reference to the start time for the switching operation. Since the number of second images being recorded in the recording medium 910 of the second camera 900 is the same as the number of times when the synchronization control unit 510 presses down the release button, a plurality of the second images correspond in time sequence to a plurality of the times BB recorded in the recording medium of the synchronization control unit 510. A shutter time lag ΔT1 of the second camera 900 is pre-measured. FIG. 14B is a timing chart illustrating an example of a switching operation of the first display device 600, the imaging and display of the first image by the first camera 800, and the imaging of the second image by a shutter operation of the second camera 900. The second image E contains display patterns of the first display device 600, the display patterns being displayed on the EVF 830 of the first camera 800. For this reason, it is possible to specify the time A based on the second image E. It is possible to specify the imaging time B when the second image E is captured, based on the time BB corresponding to the second image E and the pre-measured ΔT1. As a result, it is possible to deduce the display delay time expressed by (B−A).

In the display delay measurement, the number of groups in each of the first display device 600 or the second display device 700 may be two or more. The first camera is installed in such a manner that a direction of line-up of the groups is parallel to a direction of line-up of horizontal lines (imaging data is acquired in a unit of a horizontal line of the imaging element) in the first camera 800, or a direction of line-up of horizontal lines (display data is sequentially displayed in a unit of torpedo line) in the EVF 830. The second camera 900 is installed in such a manner that the movement direction of the shutter is parallel to the direction. As a result, it is possible to measure the display delay time at a plurality of positions in the direction of the first camera 800. At this time, an angle of view is preferably adjusted in such a manner that the entire range of the EVF 830 contained in the imaging range of the second camera 900 is as large as possible.

Figure 15:
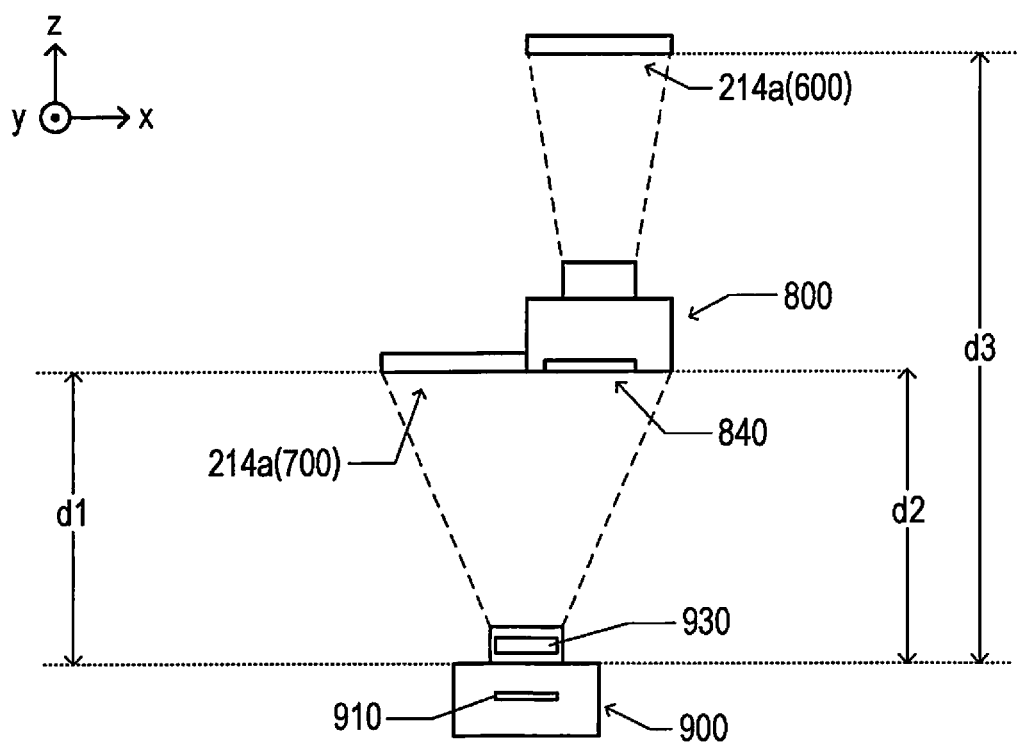
FIG. 15 is a schematic view illustrating a positional relationship between a first camera, a second camera, a first display device, and a second display device according to the other embodiment.

As illustrated in FIG. 15, the first image may be displayed in a live view mode on the back surface liquid crystal screen 840 (equivalent to the display unit of the first camera) of the first camera 800. In this case, the second camera 900 may capture the back surface liquid crystal screen 840 and the imaged surface 214*a* of the second display device 700. As illustrated in FIG. 15, the apparatuses are disposed in such a manner that the value of the distance d1 between the imaged surface 214*a* of the second display device 700 and the second camera 900 is closer to the value of the distance d2 between the back surface liquid crystal screen 840 and the second camera 900 than the value of the distance d3 between the imaged surface 214*a* of the first display device 600 and the second camera 900. For this reason, the second camera 900 easily captures the second image while both of the imaged surface 214*a* of the second display device 700 and the back surface liquid crystal screen 840 are focused. When the distance d1 is equal to the distance d2, it is easiest to focus on both. When the apparatuses are present in the range of depth of field of the second camera 900, the apparatuses may be disposed in such a manner that the distance d1 is greater than the distance d2, or the distance d1 is less than the distance d2. When the imaged surface 214*a* of the second display device 700 is larger than the back surface liquid crystal screen 840, the apparatuses are disposed in such a manner that the distance d1 is greater than the distance d2, and thereby it is possible to decrease a difference in the respective areas of both in the second image. When the imaged surface 214*a* of the second display device 700 is smaller than the back surface liquid crystal screen 840, the apparatuses are disposed in such a manner that the distance d1 is less than the distance d2, and thereby it is possible to decrease a difference in the respective areas of both in the second image.

Insofar as the imaged surface 214*a* of the first display device 600 and the back surface liquid crystal screen 840 of the first camera 800 can be positioned in the range of depth of field of the second camera 900, an image containing the imaged surface 214*a* of the first display device 600 and the back surface liquid crystal screen 840 of the first camera 800 may be captured as the second image by the second camera 900.

All of cameras in a production process may be inspected for a shutter time lag or a display delay, and a camera not satisfying the specifications of the shutter time lag or the display delay time may be eliminated from articles for shipment. After the eliminated camera may be re-inspected after being re-adjusted.

In measuring the shutter time lag according to the embodiment, the pattern continuation time is constant at all times; however, the pattern continuation time may not be constant at all times. For example, in a first step, after the switching operation starts, the resolution may be changed in the middle of the process. For example, specifically, in the configuration in which the switching operation and the shutter operation start at the same time, when it is possible to clearly recognize that the shutter time lag exceeds X seconds, the resolution may be set to be low (the pattern continuation time is set to be long) until X seconds have elapsed from the start of the switching operation, and the resolution may be set to be high (the pattern continuation time is set to short) so as to obtain a desired measurement accuracy after X seconds have elapsed. Even though the pattern continuation time is not constant at all times, when a correspondence between the sequence of display patterns and the pattern continuation time of each pattern is determined, it is possible to obtain the time (shutter time lag) from the start of the switching operation to the imaging.

In the example of the embodiment, the switching operation starts at the same time when the release button is pressed down; however, the switching operation may start after a designated time has elapsed from the pressing of the release button. For example, the designated time can be set in a range of 0 ms to 200 ms. When the switching operation starts at the same time when the release button is pressed down, and a camera having a long shutter time lag is a target for measurement, there is a possibility that the shutter time lag exceeds the maximum time for which the measurement can done using the first type display element and the second type display element. When the resolution is low (the pattern continuation time is long), it is possible to perform measurement during the maximum time, and in contrast, it is possible to measure the shutter time lag at a high accuracy. For this reason, when the switching operation is set to start after the designated time has elapsed from the pressing of the release button, it is possible to measure the shutter time lag at a high resolution (the pattern continuation time is short) and at a high accuracy even in the camera having a long shutter time lag. For example, the shutter time lag is approximately 53 ms in an initial low-resolution measurement, the designated time is set to 50 ms, and the switching operation of the LEDs is set to start after 50 ms has elapsed from the pressing of the release button. When the shutter time lag is measured at a resolution higher than that of the initial measurement, it is possible to more accurately measure the shutter time lag and the behavior of the shutter in each of the upper, middle, and lower regions.

In the display delay measurement, the resolution may be set to low (the pattern continuation time may be set to be long) until a turned-on LED is initially displayed on the liquid crystal screen 830*a*, and the resolution may be set to high (the pattern continuation time may be set to short) at the time when the turned-on LEDs start to be displayed on the liquid crystal screen 830*a*.

In the embodiment, the plurality of LEDs having successive identification numbers are turned on in any one of the display patterns; however, insofar as the above-mentioned requirements regarding the switching operation from the m-th display pattern to the (m+1)-th display pattern are satisfied, control may not be done in such a manner that the LEDs having successive identification numbers are turned on. For example, a display pattern may be configured such that every x-th LED of j LEDs are turned in the sequence of the identification numbers, and here, x (a number by which i is indivisible (for example, when i is 100, x is three or seven)) is less than i and a prime number of i. For example, when j is three, an n-th LED, an (n+x)-th LED, and an (n+2x)-th LED may be turned on in one display pattern. When a correspondence between the content of the display patterns and the sequence of the display patterns is determined, even though the display pattern is configured such that the turned-on LEDs do not have successive identification numbers, with reference to the correspondence, it is possible to specify the sequence of the display patterns imprinted in an image. A display pattern to be switched may be selected using the setting reception unit 230. Display patterns imprinted in an image and the sequence of the display patterns may be specified using a computer that executes an image processing program. For this reason, the image processing program preferably has a function by which a captured image is input, the respective positions of the turned-on LEDs are specified from the image, the matching display pattern is specified by comparing the respective positions of the turned-on LEDs to those of pre-stored display patterns, and the sequence of the display patterns is deduced from the above-mentioned correspondence.

The movement direction of the shutter is not limited to the vertical direction. Also, the present invention can be applied to the measurement of a shutter time lag of a camera having a shutter moving in a horizontal direction, or the measurement of a shutter time lag of a camera having a shutter, the opening of which decreases gradually in diameter and is closed. When the measurement of a shutter time lag is performed on the camera having the shutter moving in the horizontal direction, with reference to FIG. 1B, the shutter time lag is preferably measured in a state where the camera 400 is rotated in the x-y plane by 90 degrees relative to the display device 200. For example, when the shutter of the camera 400 moves from the left to the right (from the left to the right of the camera 400 when a back surface of the camera 400 is seen), the camera 900 may be rotated by 90 degrees from the state illustrated in FIG. 1B in such a manner that the left of the camera 400 is positioned in the −y direction of the display device 200. When the measurement of a shutter time lag is formed on the camera having the shutter, the opening of which decreases gradually in diameter and is closed, preferably, the LEDs are concentrically disposed, the center of the shutter is set to coincide with the center of circles of the LEDs, and the LEDs are grouped in such a manner that the LEDs on the same circle are contained in the same group.

REFERENCE SIGNS LIST

A1: SHUTTER TIME LAG MEASUREMENT APPARATUS
A2: DISPLAY DELAY MEASUREMENT APPARATUS
A3: DISPLAY DELAY MEASUREMENT APPARATUS
200: DISPLAY DEVICE
210: DISPLAY UNIT
212: SUPPORT SUBSTRATE
213: COVER PORTION
214: LIGHT SHIELD PORTION
214a: IMAGED SURFACE
220: CONTROL UNIT
230: SETTING RECEPTION UNIT
300: SYNCHRONIZATION CONTROL UNIT
400: CAMERA
410: IMAGING ELEMENT
420: LIGHT SHIELD CURTAIN
500: SYNCHRONIZATION CONTROL UNIT
510: SYNCHRONIZATION CONTROL UNIT
600: FIRST DISPLAY DEVICE
700: SECOND DISPLAY DEVICE
800: FIRST CAMERA
830: EVF
840: BACK SURFACE LIQUID CRYSTAL SCREEN
900: SECOND CAMERA
910: RECORDING MEDIUM

The invention claimed is:

1. A method of measuring a shutter time lag of a camera comprising:
   a first step of switching a display pattern of a display unit including i (i is a natural number greater than 2) display elements to a different display pattern at every time TP, and in the first step, the number of j (j is a natural number, and $1 \leq j \leq i$) display elements to be brought into a first display state among i display elements is switched at every time TP;
   a second step of capturing an image of the display unit in response to a shutter operation of the camera performed in synchronization with the switching operation; and
   a third step of deducing a shutter time lag taken from the shutter operation to the imaging of the display unit from the image captured by the camera.

2. The method of measuring a shutter time lag according to claim 1,
   wherein in the first step, (i−j) display elements other than j display elements in the first display state are brought into a second display state.

3. The method of measuring a shutter time lag according to claim 2,
   wherein the display element is a light emitting element, the first display state is a turn-on state, and the second display state is a turn-off state.

4. The method of measuring a shutter time lag according to claim 1,
   wherein in the switching operation, among j display elements in the first display elements, k display elements continuously in the first display state for a long time are brought into the second display state.

5. The method of measuring a shutter time lag according to claim 1, further comprising:
   a preparation step of setting at least one of i, j, k, and TP prior to the first step.

6. The method of measuring a shutter time lag according to claim 5,
   wherein when a predetermined time T is the shortest time the display element is continuously in the first display state, at least one of TP, j, and k is set in such a manner that TPj/k is greater than or equal to T.

7. The method of measuring a shutter time lag according to claim 1,
   wherein the display pattern is switched to a different display pattern in a time period from the shutter operation to the end of light exposure of the camera.

8. A method of measuring a shutter time lag of a camera using a display unit,
   wherein the display unit includes a plurality of display elements, and the plurality of display elements are grouped in such a manner that the same group includes the display elements close to each other in a predetermined direction, and each group includes a first type display element and a second type display element,
   wherein the method comprising:
   a first step of switching a display pattern of the display unit to a different display pattern at every time TP, and in the first step, at every time TP, among i (i is a natural number greater than 2) first type display elements of the group, the number of j (j is a natural number, and $1 \leq j \leq i$) first type display elements to be brought into a first display state is switched, and h (h is a natural number) second type display elements of the group display progress of the switching operation;
   a second step of capturing an image of the display unit in response to a shutter operation of the camera performed in synchronization with the switching operation, and the camera is disposed with respect to the display unit in such a manner that a movement direction of a shutter of the camera is parallel to the predetermined direction; and
   a third step of deducing a shutter time lag taken from the shutter operation to the imaging of the display unit from the image captured by the camera.

9. A display device for measuring a shutter time lag comprising:
- a display unit configured to include i (i is a natural number greater than 2) display elements; and
- a control unit in which j (j is a natural number, and 1<j<i) display elements among i display elements are brought into a first display state and thereby an m-th (m is a natural number greater than or equal to one) display pattern is formed by i display elements, and whenever a time TP has elapsed from the display of the m-th display pattern, the control unit executes a switching operation of switching i display elements in an (m+n)-th display pattern (n is a natural number) having a different number of the display elements in the first display state.

10. The method of measuring a shutter time lag according to claim 9,
- wherein the control unit brings (i−j) display elements other than j display elements in the first display state into a second display state.

11. A shutter time lag measurement apparatus comprising:
- the display device for measuring a shutter time lag according to claim 9; and
- a synchronization control unit configured to synchronize the switching operation with a shutter operation of a camera that is a target for measurement.

12. A display device for measuring a shutter time lag comprising:
- a display unit configured to include a plurality of display elements, in which the plurality of display elements are grouped in such a manner that the same group includes the display elements close to each other in a predetermined direction, and each group includes a first type display element and a second type display element; and
- a control unit configured to switch the display pattern of the display unit to a different display pattern at every time TP, to switch the number of j (j is a natural number, and 1<j<i) first type display elements to be brought into a first display state among i (i is a natural number greater than 2) first type display elements of the group at every time TP, and to control h (h is a natural number) second type display elements of the group display to display progress of the switching operation.

13. A method of manufacturing a camera comprising:
- a first step of switching a display pattern of a display unit including i (i is a natural number greater than 2) display elements to a different display pattern at every time TP, and in the first step, the number of j (j is a natural number, and 1<j<i) display elements to be brought into a first display state among i display elements is switched at every time TP;
- a second step of capturing an image of the display unit in response to a shutter operation of the camera performed in synchronization with the switching operation;
- a third step of deducing a shutter time lag taken from the shutter operation to the imaging of the display unit from the image captured by the camera; and
- a fourth step of sorting the camera satisfying a predetermined specification of the shutter time lag and the camera not satisfying the specification.

* * * * *